US009998950B2

(12) United States Patent
Zhang et al.

(10) Patent No.: US 9,998,950 B2
(45) Date of Patent: *Jun. 12, 2018

(54) PHYSICAL LAYER FRAME FORMAT FOR LONG RANGE WLAN

(71) Applicant: Marvell World Trade Ltd., St. Michael (BB)

(72) Inventors: Hongyuan Zhang, Fremont, CA (US); Rohit U. Nabar, Sunnyvale, CA (US); Raja Banerjea, Sunnyvale, CA (US); Yong Liu, Campbell, CA (US)

(73) Assignee: Marvell World Trade Ltd., St. Michael (BB)

( * ) Notice: Subject to any disclaimer, the term of this patent is extended or adjusted under 35 U.S.C. 154(b) by 525 days.

This patent is subject to a terminal disclaimer.

(21) Appl. No.: 14/518,846

(22) Filed: Oct. 20, 2014

(65) Prior Publication Data

US 2015/0350950 A1    Dec. 3, 2015

Related U.S. Application Data

(63) Continuation of application No. 13/359,336, filed on Jan. 26, 2012, now Pat. No. 8,867,653.

(Continued)

(51) Int. Cl.
*H04W 28/06* (2009.01)
*H04L 29/06* (2006.01)
(Continued)

(52) U.S. Cl.
CPC ............ *H04W 28/06* (2013.01); *H04L 5/0048* (2013.01); *H04L 5/0053* (2013.01);
(Continued)

(58) Field of Classification Search
CPC . H04L 5/0048; H04L 5/0053; H04L 27/2613; H04L 27/2666; H04L 69/22; H04W 84/12
See application file for complete search history.

(56) References Cited

U.S. PATENT DOCUMENTS 7,599,332 B2    10/2009  Zelst et al.
7,742,390 B2     6/2010  Mujtaba
(Continued)

FOREIGN PATENT DOCUMENTS

JP      2005-528002 A      9/2005
WO   WO-03/005652 A1      1/2003
(Continued)

OTHER PUBLICATIONS

Office Action in Japanese Application No. 2013-551344, dated Sep. 15, 2015, with English translation (5 pages).

(Continued)

*Primary Examiner* — Lakeram Jangbahadur

(57) ABSTRACT

In a method for generating a physical layer (PHY) data unit for transmission via a communication channel, the PHY data unit is generated according to a first PHY format when the PHY data unit is to be transmitted in a regular mode, wherein the first PHY format corresponds to a first bandwidth. The PHY data unit is generated according to a second PHY format when the PHY data unit is to be transmitted in an extended range mode, wherein the second PHY format corresponds to a second bandwidth. A preamble of the PHY data unit is modulated such that a receiving device can auto-detect whether the PHY data unit was transmitted at the first bandwidth or the second bandwidth.

15 Claims, 14 Drawing Sheets

Related U.S. Application Data

(60) Provisional application No. 61/439,773, filed on Feb. 4, 2011, provisional application No. 61/439,311, filed on Feb. 3, 2011, provisional application No. 61/437,270, filed on Jan. 28, 2011, provisional application No. 61/437,506, filed on Jan. 28, 2011, provisional application No. 61/440,788, filed on Feb. 8, 2011, provisional application No. 61/440,797, filed on Feb. 8, 2011.

(51) Int. Cl.
    *H04L 27/26* (2006.01)
    *H04L 5/00* (2006.01)
    *H04W 84/12* (2009.01)

(52) U.S. Cl.
    CPC ...... *H04L 27/2602* (2013.01); *H04L 27/2613* (2013.01); *H04L 27/2666* (2013.01); *H04L 69/02* (2013.01); *H04L 69/22* (2013.01); *H04W 84/12* (2013.01)

(56) References Cited

U.S. PATENT DOCUMENTS

| | | | |
|---|---|---|---|
| 8,155,138 | B2 | 4/2012 | van Nee |
| 8,289,869 | B2 | 10/2012 | Sawai |
| 8,331,419 | B2 | 12/2012 | Zhang et al. |
| 8,339,978 | B2 | 12/2012 | Sawai et al. |
| 8,462,863 | B1* | 6/2013 | Zhang ................ H04L 27/2602 375/260 |
| 8,498,362 | B2 | 7/2013 | Zhang et al. |
| 8,526,351 | B2 | 9/2013 | Fischer et al. |
| 8,527,853 | B2 | 9/2013 | Lakkis |
| 8,542,589 | B2 | 9/2013 | Surineni et al. |
| 8,599,804 | B2 | 12/2013 | Erceg et al. |
| 8,619,907 | B2 | 12/2013 | Mujtaba et al. |
| 8,724,720 | B2 | 5/2014 | Zhang et al. |
| 8,867,653 | B2 | 10/2014 | Zhang et al. |
| 2008/0298435 | A1 | 12/2008 | Lakkis |
| 2008/0299962 | A1 | 12/2008 | Kasher |
| 2009/0196163 | A1 | 8/2009 | Du |
| 2009/0285319 | A1 | 11/2009 | Zhang et al. |
| 2010/0046656 | A1 | 2/2010 | van Nee et al. |
| 2010/0260159 | A1* | 10/2010 | Zhang ................ H04W 28/06 370/338 |
| 2011/0002219 | A1 | 1/2011 | Kim et al. |
| 2011/0069790 | A1* | 3/2011 | Okehie ................ H04L 25/022 375/340 |
| 2011/0134899 | A1 | 6/2011 | Jones, IV et al. |
| 2011/0142020 | A1 | 6/2011 | Kang et al. |
| 2011/0299382 | A1 | 12/2011 | Van Nee et al. |
| 2011/0305296 | A1 | 12/2011 | Van Nee |
| 2012/0039406 | A1 | 2/2012 | Srinivasa et al. |
| 2012/0300874 | A1 | 11/2012 | Zhang |

FOREIGN PATENT DOCUMENTS

| | | |
|---|---|---|
| WO | WO-2009/059229 A1 | 5/2009 |
| WO | WO-2009/114612 A1 | 9/2009 |
| WO | WO-2010/005775 A1 | 1/2010 |
| WO | WO-2010/120692 A1 | 10/2010 |
| WO | WO-2012/122119 A1 | 9/2012 |

OTHER PUBLICATIONS

Second Office Action in Chinese Application No. 201280014281.5, dated Mar. 8, 2015, with English translation (6 pages).
Communication pursuant to Article 94(3) EPC in European Patent Application No. 12703655.6, dated Aug. 8, 2016 (8 pages).
Haene et al., "A Real-Time 4-Stream MIMO-OFDM Transceiver: System Design, FPGA Implementation, and Characterization," IEEE Journal on Selected Areas in Communications, vol. 26, No. 6, pp. 877-889 (Aug. 2008).
Office Action in U.S. Appl. No. 13/477,920, dated Jan. 28, 2014 (8 pages).
Notice of Allowance in U.S. Appl. No. 13/477,920, dated Jun. 6, 2014 (7 pages).
Supplemental Notice of Allowability in U.S. Appl. No. 13/477,920, dated Jul. 15, 2014 (4 pages).
Notice of Allowance in U.S. Appl. No. 13/477,920, dated Sep. 18, 2014 (7 pages).
First Office Action in Chinese Application No. 201280014281.5, dated Jul. 3, 2015, with English translation (12 pages).
Chen, "Home Network Basis: Transmission Environments and Wired/Wireless Protocols," *Prentice Hall*, pp. 1-26 (Jul. 2003).
Hiertz, et al., "The IEEE 802.11 Universe," *IEEE Communications Magazine*, pp. 62-70, (Jan. 2010).
Mujtaba, S.A. "IEEE P802.11—Wireless LANs, TGn Sync Proposal Technical Specification," *The Institute of Electrical and Electronics Engineers, Inc.*, doc.: IEEE 802.11-04/0889r6, pp. 1-131 (May 2005).
Park, "Proposed Specification Framework for TGah", *The Institute of Electrical and Electronics Engineers*, doc. No. IEEE 802.11—yy/xxxxr05, (Jan. 2012).
Zhang et al., "11 ah Data Transmission Flow," *The Institute of Electrical and Electronics Engineers*, doc. No. IEEE 802.11-11/1484r1 , pp. 1-15 (Nov. 2011).
IEEE Std P802.11—REVma/06.0, (Revision of IEEE Std 802.11-1999) "Unapproved Draft Standard for Information Technology—Telecommunications and information exchange between systems—Local and metropolitan area network—Specific requirements Part 11: Wireless LAN Medium Access Control (MAC) and Physical Layer (PHY) specifications," (This document reflects the combining of the 2003 Edition of 802.11 plus the 802.11 g, 802.11 h, 802.11 i and 802.11j Amendments) (Superseded by P802.11-REVma_D7. 0), pp. 1-1212 (2006).
IEEE Std 802.11-2007 (revision of IEEE Std. 802.11-1999) "Information Standard for Information technology—Telecommunications and information exchange between systems—Local and metropolitan area networks—Specific requirements" Part 11: Wireless LAN Medium Access Control (MAC) and Physical Layer (PHY) Specifications, *The Institute of Electrical and Electronics Engineers, Inc.*, pp. 1-1184 (Jun. 12, 2007).
IEEE Std 802.11a-1999 (Supplement to IEEE Std 802.11-1999) "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-Speed Physical Layer in the 5 GHZ Band," *The Institute of Electrical and Electronics Engineers, Inc.*, pp. 1-83 (Sep. 1999).
IEEE Std 802.11ac/D2.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-359 (Jan. 2012).
IEEE Std P802.11ad/D5.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 3: Enhancements for Very High Throughput in the 60 GHz Band," *The Institute of Electrical and Electronics Engineers, Inc.*, pp. 1-601 (Sep. 2011).
IEEE Std 802.11af/D1.05 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: TV White Spaces Operation," *The Institute of Electrical and Electronics Engineers, Inc.*, pp. 1-123 (Nov. 2011).
IEEE Std 802.11b-1999/Cor Jan. 2001 (Corrigendum to IEEE Std 802.11b-1999) "IEEE Standard for Information technology—Telecommunications and information exchange between systems—

(56) References Cited

OTHER PUBLICATIONS

Local and metropolitan area networks—Specific requirements, Part 11: Wireless LAN Medium Access Control (MAC) and Physical Layer (PHY) specifications, Amendment 2: Higher-speed Physical Layer (PHY) extension in the 2.4 GHz band—Corrigendum 1," *The Institute of Electrical and Electronics Engineers, Inc.*, pp. 1-23 (Nov. 7, 2001).
IEEE Std 802.11g/D2.8, May 2002 (Supplement to ANSI/IEEE Std 802.11, 1999 Edition) "Draft Supplement to Standard [for] Information technology—Telecommunications and information exchange between systems—Local and metropolitan area networks—Specific requirements—Part 11: Wireless LAN Medium Access Control (MAC) and Physical Layer (PHY) specifications: Further Higher-Speed Physical Layer Extension in the 2.4 GHz Band," *The Institute of Electrical and Electronics Engineers, Inc.*, pp. 1-53 (May 2002).
IEEE Std 802.11g/D8.2, Apr. 2003 (Supplement to ANSI/IEEE Std 802.11, 1999 (Reaff 2003)) "Draft Supplement to Standard [for] Information technology—Telecommunications and information exchange between systems—Local and metropolitan area networks—Specific requirements, Part 11: Wireless LAN Medium Access Control (MAC) and Physical Layer (PHY) specifications: Further Higher Data Rate Extension in the 2.4 GHz Band," *The Institute of Electrical and Electronics Engineers, Inc.*, pp. 1-69 (Apr. 2003).
IEEE P802.11 nTM/D3.00, "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Higher Throughput," *The Institute of Electrical and Electronics Engineers, Inc.*, pp. 1-544 (Sep. 2007).
IEEE Std. 802.11nTM "IEEE Standard for Information Technology—Telecommunications and information exchange between systems—Local and metropolitan area networks—Specific requirements, Part 11: Wireless LAN Medium Access Control (MAC) and Physical Layer (PHY) Specifications: Amendment 5: Enhancements for Higher Throughput," *The Institute of Electrical and Electronics Engineers, Inc.*, pp. 1-535 (Oct. 2009).
de Vegt, "Potential Compromise for 802.11 ah Use Case Document", Institute of Electrical and Electronics Engineers, doc. No. IEEE 802.11-11/0457r0, pp. 1-27 (Mar. 2011).
Gunnam, et al., "Multi-Rate Layered Decoder Architecture for Block LDPC Codes of the IEEE 802.11n Wireless Standard," IEEE International Symposium on Circuits and Systems, 2007 (ISCAS 2007), pp. 1645-1648 (2007).
Harada, "Project: IEEE P802.15 Working Group for Wireless Personal Area Network (WPANs)," IEEE 802.15-07-0693-003c, slides 24-33 (May 2007).
Imashioya et al., "RTL Design of 1.2 Gbps MIMO WLAN System and Its Business Aspect," IEEE 9th Int'l Symposium on Communications and Information Technology (ISCIT 2009), *The Institute of Electrical and Electronics Engineers*, pp. 296-301 (2009).
Perahia, et al., "Gigabit Wireless LANs: an overview of IEEE 802.11ac and 80211ad," ACM SIGMOBILE Mobile Computing and Communications Review, vo. 15, No. 3, pp. 23-33 (Jul. 2011).

Shi et al., "Phase Tracking During VHT-LTF," Doc. No. IEEE 802.11-10/0771r0, *The Institute of Electrical and Electronics Engineers, Inc.*, pp. 1-19 (Jul. 2010).
Stacey et al., "IEEE P802.11, Wireless LANs, Proposed TGac Draft Amendment," Institute of Electrical and Electronics Engineers, doc. No. IEEE 802.11-10/1361r3 pp. 1-154 (Jan. 2011).
Syafei et al., "Design of 1.2 Gbps MIMO WLAN System for 4K Digital Cinema Transmission," IEEE 20th Int'l Symposium on Personal, Indoor and Mobile Radio Communications (PIMRC 2009), *The Institute of Electrical and Electronics Engineers*, pp. 207-211 (2009).
Stacey et al., "Specification Framework for TGac," document No. IEEE 802.11-09/0992r20, *Institute for Electrical and Electronics Engineers*, pp. 1-49, (Jan. 18, 2011).
Syafei et al., "A Design of Next Generation Gigabit MIMO Wireless LAN System," IEEE 12th Int'l Conference on Advanced Communication Technology (ICACT 2010), *The Institute of Electrical and Electronics Engineers*, pp. 941-946 (2010).
Syafei et al., "A Gigabit MIMO WLAN System with International Standardization Strategy," IEEE Int'l Symposium on Intelligent Signal Processing and Communication Systems (ISPACS 2009), *The Institute of Electrical and Electronics Engineers*, pp. 228-231 (2009).
Taghavi et al., "Introductory Submission for TGah", doc. No. IEEE 802.11-11/0062r0, *Institute for Electrical and Electronics Engineers*, pp. 1-5 (Jan. 14, 2011).
van Nee, et al. "The 802.11n MIMO-OFDM Standard for Wireless LAN and Beyond," Wireless Personal Communications, vol. 37, pp. 445-453 (Jun. 2006).
van Zelst et al., "Pilot Sequence for VHT-Data," Doc. No. IEEE 802.11-10/0811r1, *The Institute of Electrical and Electronics Engineers, Inc.*, pp. 1-10 (Jul. 2010).
Vermani, et al. "Preamble Format for 1 MHz," *The Institute of Electrical and Electronics Engineers*, doc. No. IEEE 802.11-11/1482r2, pp. 1-30 (Nov. 2011).
Vermani, et al. "Spec Framework Text for PHY Numerology," *The Institute of Electrical and Electronics Engineers*, doc. No. IEEE 802.11-11/1311r0, pp. 1-5 (Sep. 2011).
Yu et al., "Coverage extension for IEEE802.11ah," *The Institute of Electrical and Electronics Engineers*, doc. No. IEEE 802.11-11/0035r1 , pp. 1-10 (Jan. 2011).
Zhang et al., "11ac Explicit Sounding and Feedback", *The Institute of Electrical and Electronics Engineers*, doc. No. IEEE 802.11-10/1105r0, 44 pages (Sep. 2010).
Invitation to Pay Additional Fees and Partial International Search Report for International Applicatio nNo. PCT/US2012/022768, dated Apr. 26, 2012 (8 pages).
International Search Report and Written Opinion for International Application No. PCT/US2012/022768, dated Jul. 5, 2012 (19 pages).
International Preliminary Report on Patentability in corresponding PCT/US2012/022768 dated Jul. 30, 2013 (12 pages).
Park, "Proposed Specification Framework for TGah", *The Institute of Electrical and Electronics Engineers*, doc. No. IEEE 802.11--yy/xxxxr05, pp. 1-12 (Jan. 19, 2012).
Vermani et al., "Preamble Format for 1 MHz," The Institute of Electrical and Electronics Engineers, doc. No. IEEE 802.11-11/1482r3, pp. 1-28 (Jan. 16, 2012).

\* cited by examiner

PHYSICAL LAYER FRAME FORMAT FOR LONG RANGE WLAN

CROSS-REFERENCES TO RELATED APPLICATIONS

This disclosure is a continuation of U.S. application Ser. No. 13/359,336, filed Jan. 26, 2012, which claims the benefit of the following U.S. Provisional Patent Applications:
U.S. Provisional Patent Application No. 61/437,506, entitled "Preamble of 11 ah for WLAN Range Extension," filed on Jan. 28, 2011;
U.S. Provisional Patent Application No. 61/439,311, entitled "Preamble of 11 ah for WLAN Range Extension," filed on Feb. 3, 2011;
U.S. Provisional Patent Application No. 61/440,788, entitled "Preamble of 11 ah for WLAN Range Extension," filed on Feb. 8, 2011;
U.S. Provisional Patent Application No. 61/437,270, entitled "PHY Layer of 11 ah for WLAN Range Extension," filed on Jan. 28, 2011;
U.S. Provisional Patent Application No. 61/439,773, entitled "PHY Layer of 11 ah for WLAN Range Extension," filed on Feb. 4, 2011; and
U.S. Provisional Patent Application No. 61/440,797, entitled "PHY Layer of 11 ah for WLAN Range Extension," filed on Feb. 8, 2011;
The disclosures of all of the above-referenced patent applications are hereby incorporated by reference herein in their entireties.

FIELD OF THE DISCLOSURE

The present disclosure relates generally to communication networks and, more particularly, to long range low power wireless local area networks.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

When operating in an infrastructure mode, wireless local area networks (WLANs) typically include an access point (AP) and one or more client stations. WLANs have evolved rapidly over the past decade. Development of WLAN standards such as the Institute for Electrical and Electronics Engineers (IEEE) 802.11a, 802.11b, 802.11g, and 802.11n Standards has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, the IEEE 802.11n Standard specifies a single-user peak throughput of 600 Mbps, and the IEEE 802.11ac Standard specifies a single-user peak throughput in the gigabits per second (Gbps) range.

Work has begun on two new standards, IEEE 802.11ah and IEEE 802.11af, each of which will specify wireless network operation in sub-1 GHz frequencies. Lower frequency communication channels are generally characterized by better propagation qualities and extended propagation ranges compared to transmission at higher frequencies. In the past, sub-1 GHz ranges have not been utilized for wireless communication networks because such frequencies were reserved for other applications (e.g., licensed TV frequency bands, radio frequency band, etc.). There are few frequency bands in the sub 1-GHz range that remain unlicensed, with different specific unlicensed frequencies in different geographical regions. The IEEE 802.11ah Standard will specify wireless operation in available unlicensed sub-1 GHz frequency bands. The IEEE 802.11af Standard will specify wireless operation in TV White Space (TVWS), i.e., unused TV channels in sub-1 GHz frequency bands.

SUMMARY

In one embodiment, a method for generating a physical layer (PHY) data unit for transmission via a communication channel includes generating a first preamble portion of the data unit, wherein the first preamble portion includes one or more long training fields and generating a data portion of the data unit. The method also includes modulating the first preamble portion and the data portion using a plurality of orthogonal frequency division multiplexing (OFDM) symbols, wherein symbol duration of each OFDM symbol of the plurality of OFDM symbols is at least 8 µs. The method further includes generating the data unit to include the plurality of OFDM symbols.

In another embodiment, an apparatus includes a network interface configured to generate a first preamble portion of the data unit, wherein the first preamble portion includes one or more long training fields. The network interface is also configured to generate a data portion of the data unit. The network interface is further configured to modulate the first preamble portion and the data portion using a plurality of orthogonal frequency division multiplexing (OFDM) symbols, wherein symbol duration of each OFDM symbol of the plurality of OFDM symbols is at least 8 µs. The network interface is still further configured to generate the data unit to include the plurality of OFDM symbols.

In yet another embodiment, a method for generating a physical layer (PHY) data unit for transmission via a communication channel includes generating the data unit according to a first PHY format when the data unit is to be transmitted in a regular mode, wherein the first PHY format corresponds to a first bandwidth. The method also includes generating the data unit according to a second PHY format when the data unit is to be transmitted in an extended range mode, wherein the second PHY format corresponds to a second bandwidth. A preamble of the data unit is modulated such that a receiving device can auto-detect whether the data unit was transmitted at the first bandwidth or the second bandwidth.

In still another embodiment, an apparatus includes a network interface configured to generate the data unit according to a first PHY format and if the data unit is to be transmitted in a regular mode, wherein the first PHY format corresponds to a first bandwidth. The network interface is also configured to generate the data unit according to a second PHY format and if the data unit is to be transmitted in an extended range mode, wherein the second PHY format corresponds to a second bandwidth. A preamble of the data unit is modulated such that a receiving device can auto-detect whether the data unit was transmitted at the first bandwidth or the second bandwidth.

In yet another embodiment, a method for generating a physical layer (PHY) data unit for transmission via a communication channel includes generating the PHY data unit according to a first PHY format when the PHY data unit is to be transmitted in a regular mode, wherein the first PHY format corresponds to a first bandwidth; and generating the PHY data unit according to a second PHY format when the PHY data unit is to be transmitted in an extended range mode, wherein the second PHY format corresponds to a second bandwidth; wherein a preamble of the PHY data unit is modulated such that a receiving device can auto-detect whether the PHY data unit was transmitted at the first bandwidth or the second bandwidth.

In another embodiment, a network interface having one or more integrated circuits configured to: when a physical layer (PHY) data unit is to be transmitted via a communication channel in a regular mode, generate the PHY data unit according to a first PHY format, wherein the first PHY format corresponds to a first bandwidth, and when the PHY data unit is to be transmitted via the communication channel in an extended range mode, generate the PHY data unit according to a second PHY format, wherein the second PHY format corresponds to a second bandwidth; wherein a preamble of the PHY data unit is modulated such that a receiving device can auto-detect whether the PHY data unit was transmitted at the first bandwidth or the second bandwidth.

DETAILED DESCRIPTION

In embodiments described below, a wireless network device such as an access point (AP) of a wireless local area network (WLAN) transmits data streams to one or more client stations. The AP is configured to operate with client stations according to at least a first communication protocol. The first communication protocol defines operation in a sub 1 GH frequency range, and is typically used for applications requiring long range wireless communication with relatively low data rates. The first communication protocol (e.g., IEEE 802.11af or IEEE 802.11ah) is referred to herein as a "long range" communication protocol. In some embodiment, the AP is also configured to operate with client stations according to one or more other communication protocols which define operation in generally higher frequency ranges and are typically used for communication in closer ranges and with generally higher data rates. The closer range communication protocols are collectively referred to herein as "short range" communication protocols.

In some embodiments, the long range communication protocol defines one or more physical layer data unit formats the same as or similar to physical layer data unit format defined by one or more of the short range communication protocols. In one embodiment, to support communication over a longer range, and also to accommodate typically smaller bandwidth channels available at lower (sub 1-GHz) frequencies, the long range communication protocol defines data units having a format that is substantially the same as a physical layer data unit format defined by a long range communication protocol, but generated using a lower clock rate. In an embodiment, the AP operates at a clock rate suitable for short range (and high throughput) operation, and down-clocking is used to generate a new clock signal to be used for the sub 1 GHz operation. As a result, in this embodiment, a data unit that conforms to the long rage communication protocol ("long range data unit") maintains a physical layer format of a data unit that generally conforms to a short range communication protocol ("short range data unit"), but is transmitted over a longer period of time. Additionally, in some embodiments, the long range communication protocol defines one or more additional communication modes having even lower data rates and intended for extended range operations.

Figure 1:
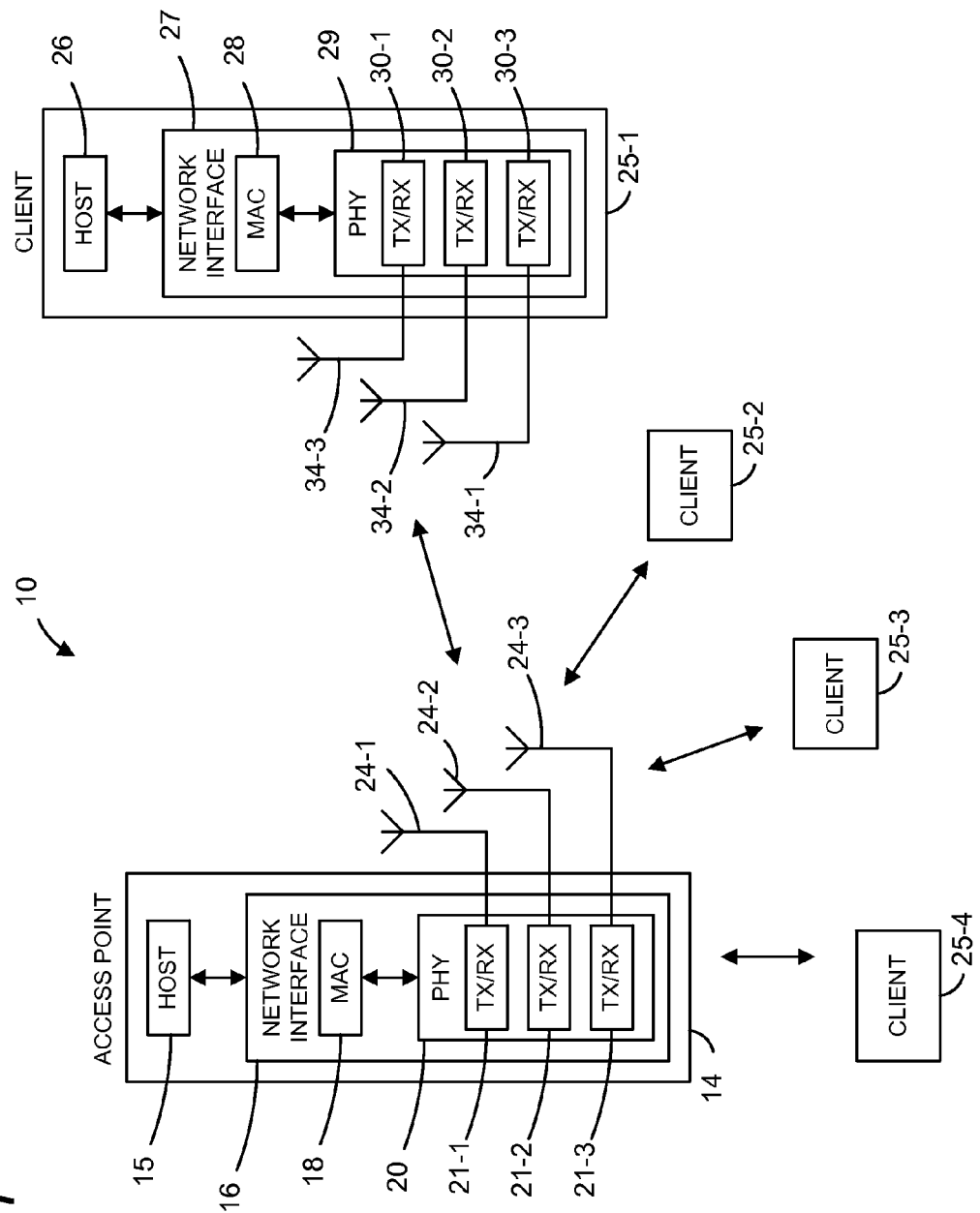
FIG. 1 is a block diagram of an example wireless local area network (WLAN) 10, according to an embodiment.

FIG. 1 is a block diagram of an example wireless local area network (WLAN) 10, according to an embodiment. An AP 14 includes a host processor 15 coupled to a network interface 16. The network interface 16 includes a medium access control (MAC) unit 18 and a physical layer (PHY) unit 20. The PHY unit 20 includes a plurality of transceivers 21, and the transceivers 21 are coupled to a plurality of antennas 24. Although three transceivers 21 and three antennas 24 are illustrated in FIG. 1, the AP 14 can include different numbers (e.g., 1, 2, 4, 5, etc.) of transceivers 21 and antennas 24 in other embodiments.

The WLAN 10 includes a plurality of client stations 25. Although four client stations 25 are illustrated in FIG. 1, the WLAN 10 can include different numbers (e.g., 1, 2, 3, 5, 6, etc.) of client stations 25 in various scenarios and embodiments. At least one of the client stations 25 (e.g., client station 25-1) is configured to operate at least according to the long range communication protocol. In some embodiments, at least one of the client stations 25 (e.g., client station 25-4) is a short range client station that is configured to operate according to one or more of the short range communication protocols.

The client station 25-1 includes a host processor 26 coupled to a network interface 27. The network interface 27 includes a MAC unit 28 and a PHY unit 29. The PHY unit 29 includes a plurality of transceivers 30, and the transceivers 30 are coupled to a plurality of antennas 34. Although three transceivers 30 and three antennas 34 are illustrated in FIG. 1, the client station 25-1 can include different numbers (e.g., 1, 2, 4, 5, etc.) of transceivers 30 and antennas 34 in other embodiments.

In an embodiment, one or both of the client stations 25-2 and 25-3, has a structure the same as or similar to the client station 25-1. In an embodiment, the client station 25-4 has a structure similar to the client station 25-1. In these embodiments, the client stations 25 structured the same as or similar to the client station 25-1 have the same or a different number of transceivers and antennas. For example, the client station 25-2 has only two transceivers and two antennas, according to an embodiment.

In various embodiments, the PHY unit 20 of the AP 14 is configured to generate data units conforming to the long range communication protocol and having formats described hereinafter. The transceiver(s) 21 is/are configured to transmit the generated data units via the antenna(s) 24. Similarly, the transceiver(s) 24 is/are configured to receive the data units via the antenna(s) 24. The PHY unit 20 of the AP 14 is configured to process received data units conforming to the long range communication protocol and having formats described hereinafter, according to various embodiments.

In various embodiments, the PHY unit 29 of the client device 25-1 is configured to generate data units conforming to the long range communication protocol and having formats described hereinafter. The transceiver(s) 30 is/are configured to transmit the generated data units via the antenna(s) 34. Similarly, the transceiver(s) 30 is/are configured to receive data units via the antenna(s) 34. The PHY unit 29 of the client device 25-1 is configured to process received data units conforming to the long range communication protocol and having formats described hereinafter, according to various embodiments.

Figure 2A:
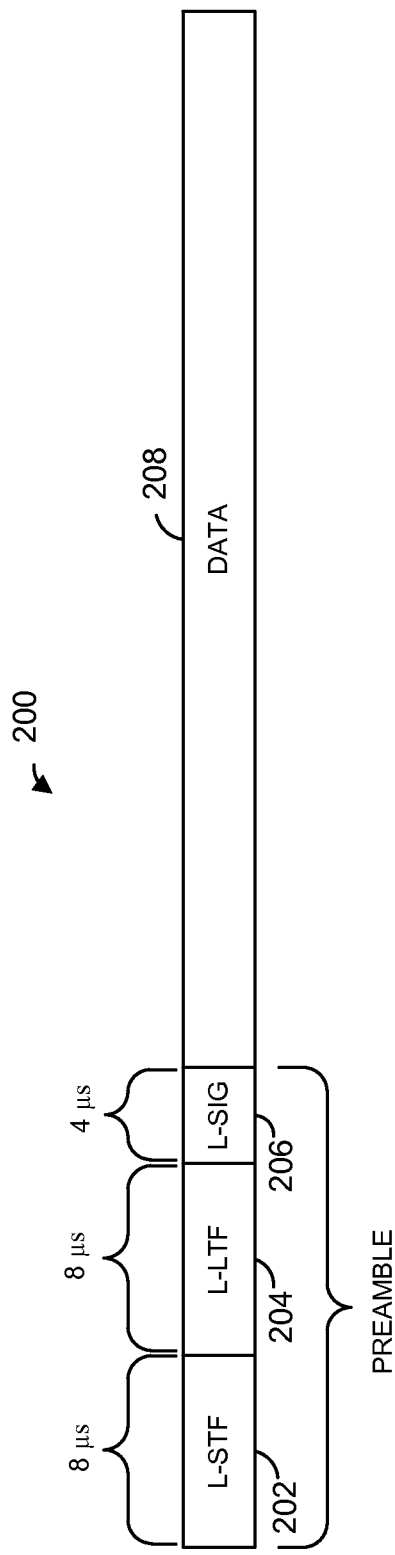
FIGS. 2A and 2B are diagrams of a short range orthogonal frequency division multiplexing (OFDM) data unit, according to an embodiment.
Figure 2B:

FIG. 2A is a diagram of a short range OFDM data unit 200 that the AP 14 is configured to transmit to the client station 25-4 via orthogonal frequency division multiplexing (OFDM) modulation, according to an embodiment. In an embodiment, the client station 25-4 is also configured to transmit the data unit 200 to the AP 14. The data unit 200 conforms to the IEEE 802.11a Standard and occupies a 20 Megahertz (MHz) band. The data unit 200 includes a preamble having a legacy short training field (L-STF) 202, generally used for packet detection, initial synchronization, and automatic gain control, etc., and a legacy long training field (L-LTF) 204, generally used for channel estimation and fine synchronization. The data unit 200 also includes a legacy signal field (L-SIG) 206, used to carry certain physical layer (PHY) parameters of with the data unit 200, such as modulation type and coding rate used to transmit the data unit, for example. The data unit 200 also includes a data portion 208. FIG. 2B is a diagram of example data portion 208 (not low density parity check encoded), which includes a service field, a scrambled physical layer service data unit (PSDU), tail bits, and padding bits, if needed. The data unit 200 is designed for transmission over one spatial or space-time stream in single input a single output (SISO) channel configuration.

Figure 3:
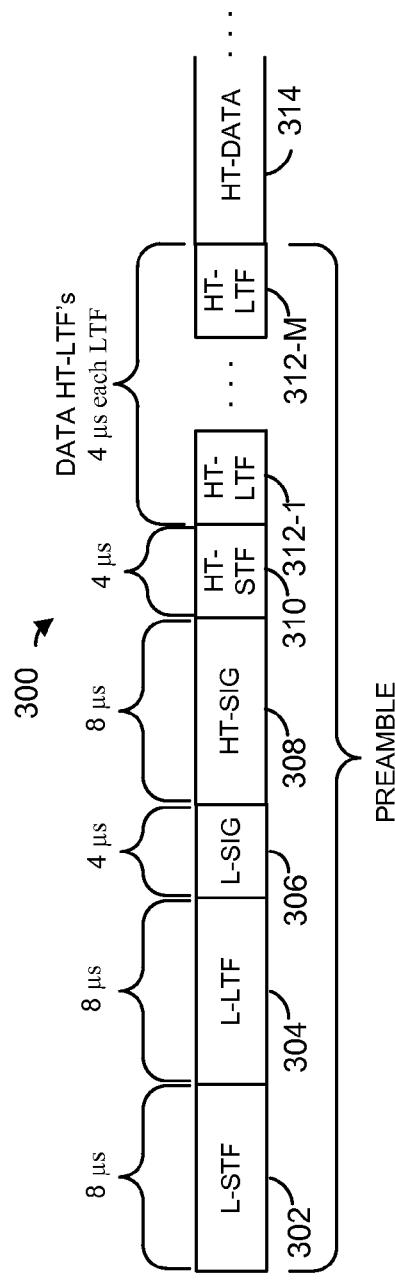
FIG. 3 is a diagram of a short range OFDM data unit, according to another embodiment.

FIG. 3 is a diagram of a short range OFDM data unit 300 that the AP 14 is configured to transmit to the client station 25-4 via orthogonal frequency domain multiplexing (OFDM) modulation, according to an embodiment. In an embodiment, the client station 25-4 is also configured to transmit the data unit 300 to the AP 14. The data unit 300 conforms to the IEEE 802.11n Standard, occupies a 20 MHz band, and is designed for mixed mode situations, i.e., when the WLAN includes one or more client stations that conform to the IEEE 802.11a Standard but not the IEEE 802.11n Standard. The data unit 300 includes a preamble having an L-STF 302, an L-LTF 304, an L-SIG 306, a high throughput signal field (HT-SIG) 308, a high throughput short training field (HT-STF) 310, and M data high throughput long training fields (HT-LTFs) 312, where M is an integer which generally corresponds to a number of spatial streams used to transmit the data unit 300 in a multiple input multiple output (MIMO) channel configuration. In particular, according to the IEEE 802.11n Standard, the data unit 300 includes two HT-LTFs 312 if the data unit 300 is transmitted using two spatial streams, and four HT-LTFs 312 is the data unit 300 is transmitted using three or four spatial streams. An indication of the particular number of spatial streams being utilized is included in the HT-SIG field 308. The data unit 300 also includes a data portion 314.

Figure 4:
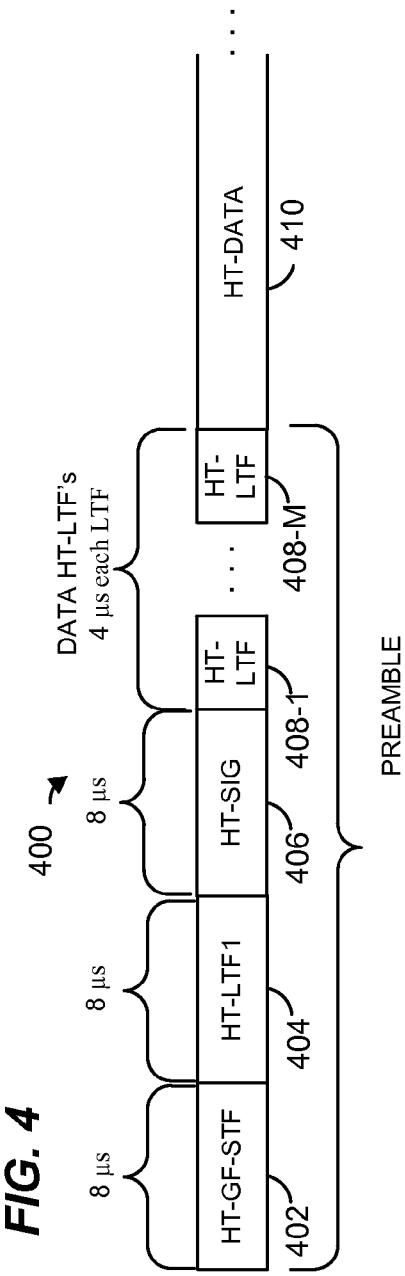
FIG. 4 is a diagram of a short range OFDM data unit, according to another embodiment.

FIG. 4 is a diagram of a short range OFDM data unit 400 that the AP 14 is configured to transmit to the client station 25-4 via orthogonal frequency domain multiplexing (OFDM) modulation, according to an embodiment. In an embodiment, the client station 25-4 is also configured to transmit the data unit 400 to the AP 14. The data unit 400 conforms to the IEEE 802.11n Standard, occupies a 20 MHz band, and is designed for "Greenfield" situations, i.e., when the WLAN does not include any client stations that conform to the IEEE 802.11a Standard but not the IEEE 802.11n Standard. The data unit 400 includes a preamble having a high throughput Greenfield short training field (HT-GF-STF) 402, a first high throughput long training field (HT-LTF1) 404, a HT-SIG 406, and M data HT-LTFs 408, where M is an integer which generally corresponds to a number of spatial streams used to transmit the data unit 400 in a multiple input multiple output (MIMO) channel configuration. The data unit 90 also includes a data portion 98.

Figure 5:
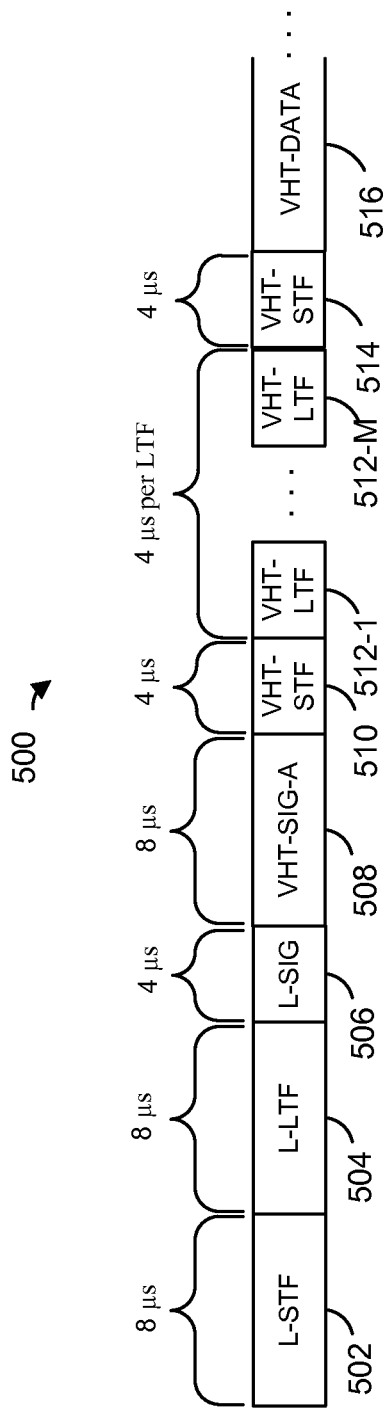
FIG. 5 is a diagram of a short range OFDM data unit, according to another embodiment.

FIG. 5 is a diagram of a short range OFDM data unit 500 that the client station AP 14 is configured to transmit to the client station 25-4 via orthogonal frequency domain multiplexing (OFDM) modulation, according to an embodiment. In an embodiment, the client station 25-4 is also configured to transmit the data unit 500 to the AP 14. The data unit 500 conforms to the IEEE 802.11ac Standard and is designed for "Mixed field" situations. The data unit 500 occupies a 20 MHz bandwidth. In other embodiments or scenarios, a data unit similar to the data unit 500 occupies a different bandwidth, such as a 40 MHz, an 80 MHz, or a 160 MHz bandwidth. The data unit 500 includes a preamble having an L-STF 502, an L-LTF 504, an L-SIG 506, a first very high throughput signal field (VHT-SIG-A) 508, a very high throughput short training field (VHT-STF) 510, M very high throughput long training fields (VHT-LTFs) 512, where M is an integer, and a second very high throughput signal field (VHT-SIG-B) 512. The data unit 500 also includes a data portion 514. In some embodiments, the data unit 500 is a multi-user data unit which carries information to more than one of the client stations 25 simultaneously. In such embodiments or scenarios, the first VHT-SIG-A includes information common to all of the intended client stations, and VHT-SIG-B includes user-specific information for each of the intended client stations.

Figure 6:
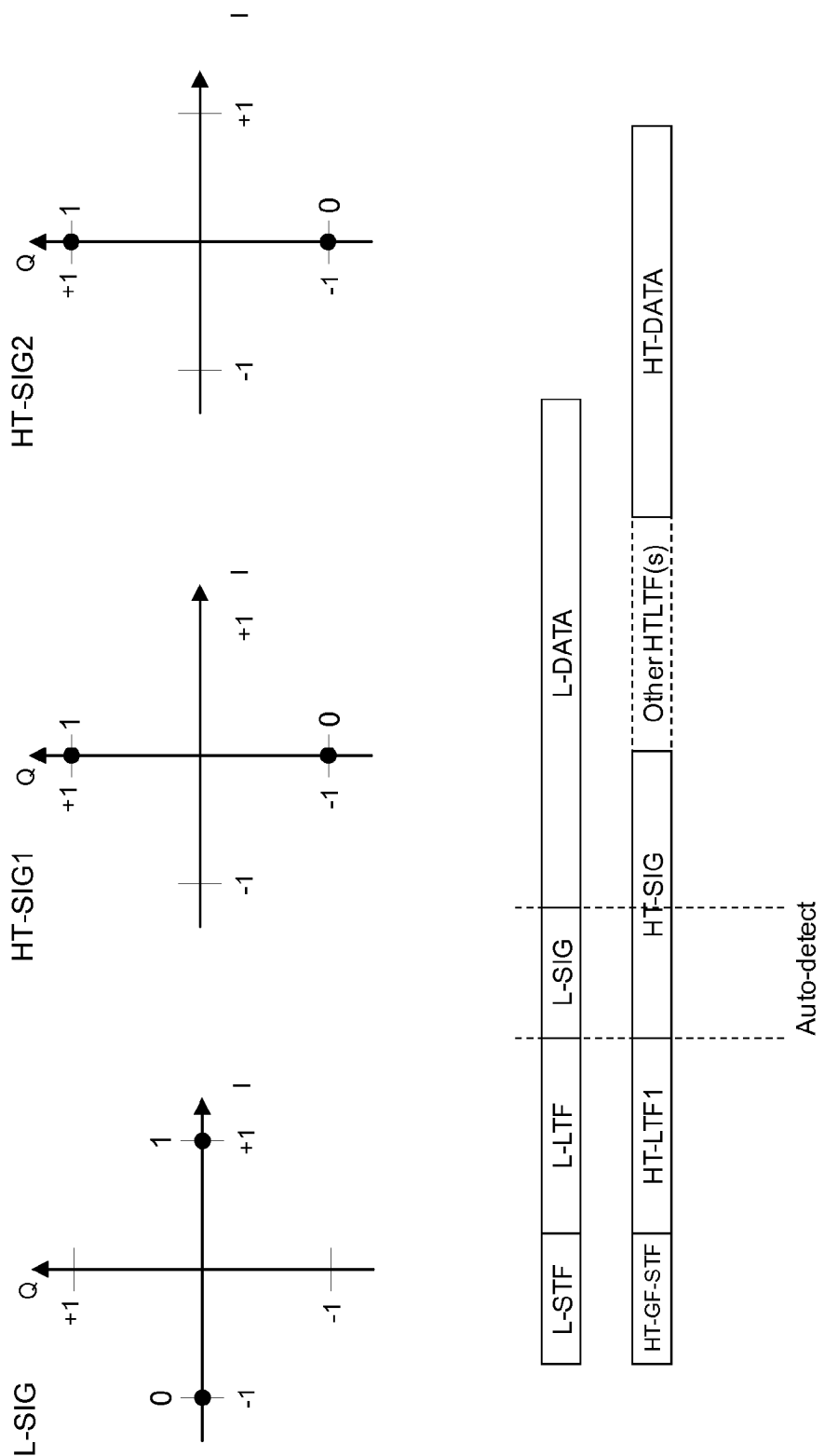
FIG. 6 is a set of diagrams illustrating modulation of various preamble fields as defined by the IEEE 802.11n Standard.

FIG. 6 is a set of diagrams illustrating modulation of the L-SIG, HT-SIG1, and HT-SIG2 fields as defined by the IEEE 802.11n Standard. The L-SIG field is modulated according to binary phase shift keying (BPSK), whereas the HT-SIG1 and HT-SIG2 fields are modulated according to BPSK, but on the quadrature axis (Q-BPSK). In other words, the modulation of the HT-SIG1 and HT-SIG2 fields is rotated by 90 degrees as compared to the modulation of the L-SIG field. As illustrated in FIG. 6, such modulation allows a receiving device to determine or auto-detect, without decoding the entire preamble, that the data unit conforms to the IEEE802.11n Standard rather than the IEE802.11a Standard.

Figure 7:
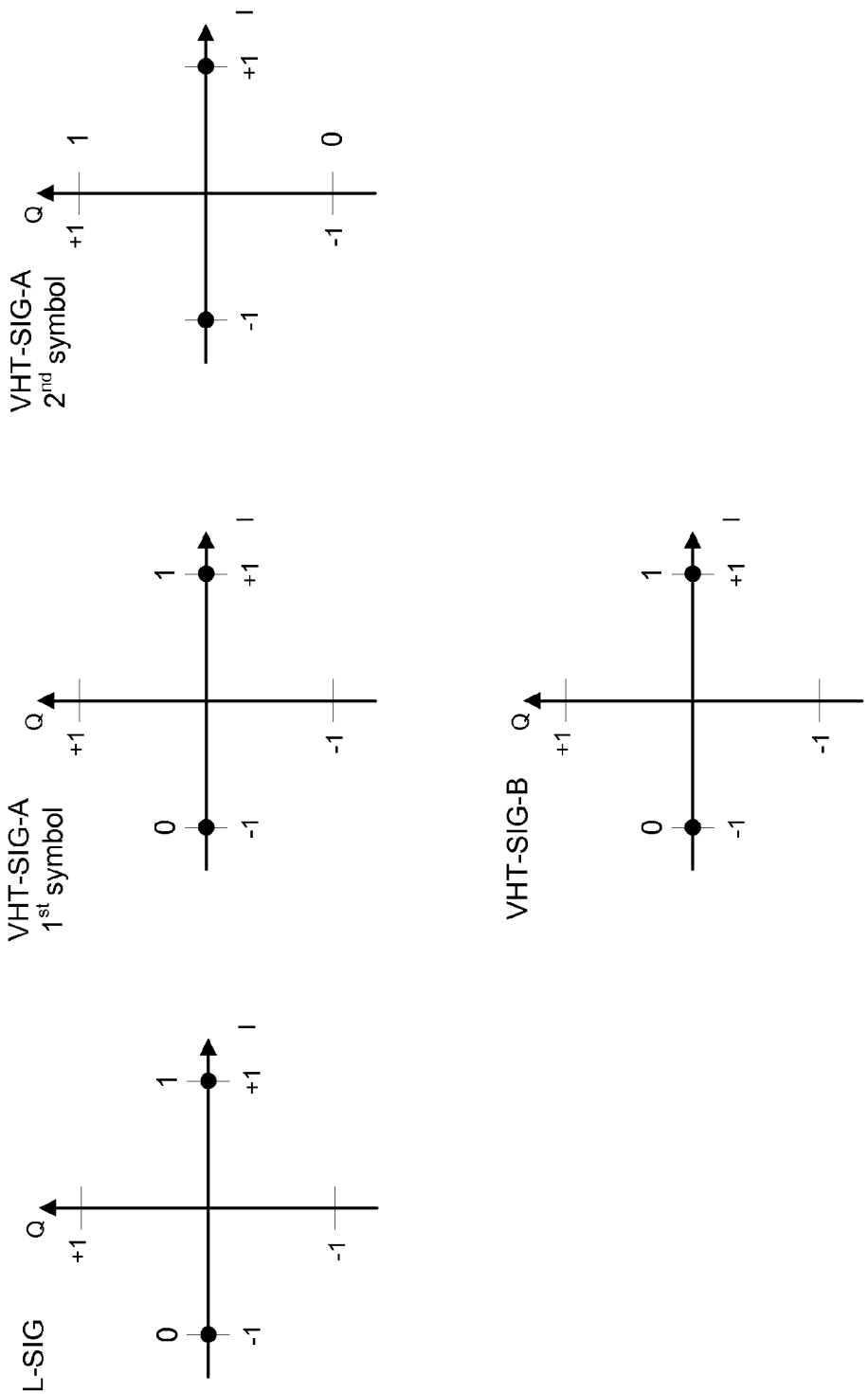
FIG. 7 is a set of diagrams illustrating modulation of various preamble fields as defined by the IEEE 802.11ac Standard.

FIG. 7 is a set of diagrams illustrating modulation of the L-SIG field, the first symbol of the VHT-SIG-A field, the second symbol of the VHT-SIG-A field, and VHT-SIG-B as defined by the IEEE 802.11ac Standard. The L-SIG is modulated according to binary phase shift keying (BPSK). Similarly, first symbol of the VHT-SIGA field is modulated according to BPSK. On the other hand, the second symbol of the VHT-SIG-A field is modulated according to BPSK, but on the quadrature axis (Q-BPSK). The VHT-SIG-B field is modulated according to BPSK, similar to the L-SIG-field and the first symbol of the VHT-SIG-A field. Similar to the 802.11n auto-detect feature discussed above, such modulation allows a receiving device to determine or auto-detect, without decoding the entire preamble, that the data unit conforms to the IEEE802.11ac Standard rather than either one of the IEE802.11a Standard or the IEEE802.11n Standard.

Figure 8:
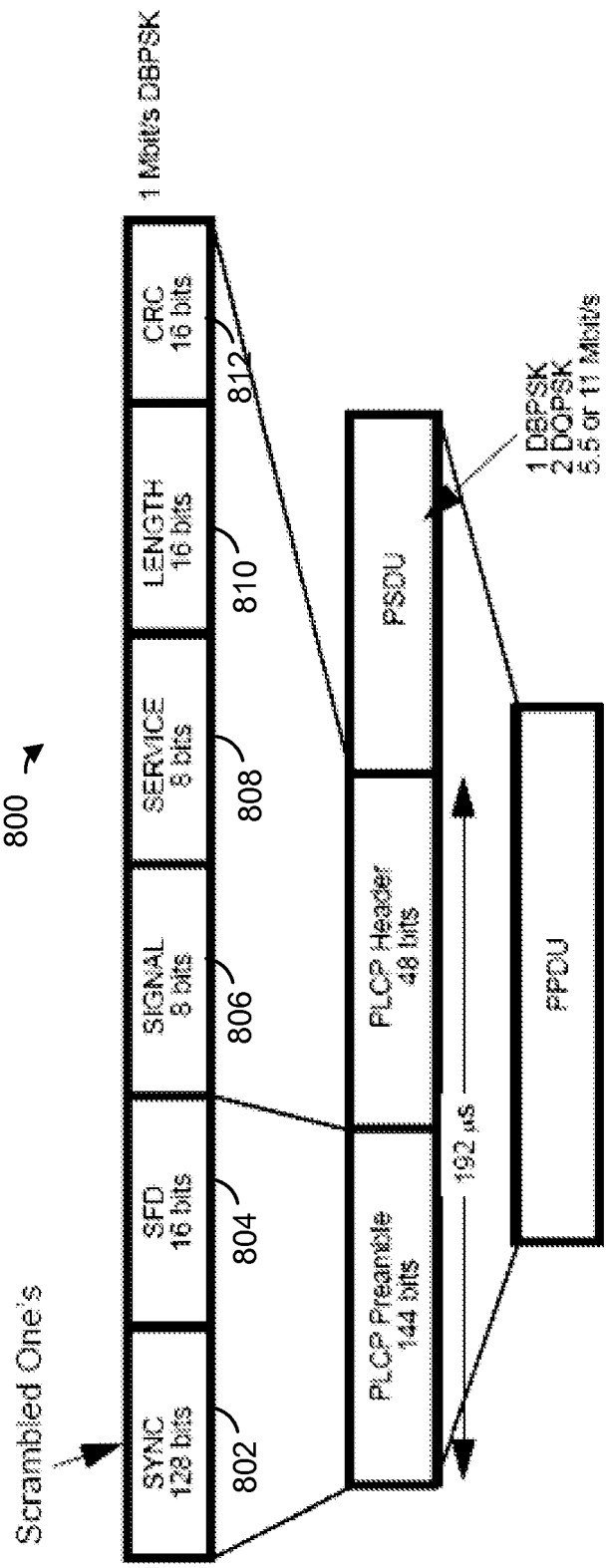
FIG. 8 is a diagram of a single carrier (SC) short range data unit, according to an embodiment.

FIG. 8 is a diagram of a single carrier (SC) short range data unit 800 that the client station AP 14 configured to transmit to the client station 25-4 via a single carrier channel, according to an embodiment. In an embodiment, the client station 25-4 is also configured to transmit the data unit 800 to the AP 14. The data unit 800 includes a SYNC field 802 that allows a receiver to detect presence of a data unit and begin synchronizing with the incoming signal. The data 800 also include a start frame delimiter (SFD) field 804 that signals the beginning of a frame. The SYNC field 802 and the SFD field 804 form the preamble portion of the data unit 800. The data unit 800 also includes a header portion containing the SIGNAL field 806, the SERVICE field 808, a LENGTH field 810, and CRC field 812. The data unit 800 also includes a physical layer service data unit (PSDU), i.e., the data portion 814.

In various embodiments and/or scenarios, long range data units have a physical layer format the same as or similar to the physical layer data unit format defined by a short range communication protocol (e.g., a physical data unit format described above with respect to FIGS. 2-5), but transmitted using slower clock rate. In such embodiments, the AP 14 down-samples or "down-clocks" the clock rate used for generating short range data units, by a factor of N, to a lower clock rate to be used for transmitting long range data units. The down-clocking factor N is different in different embodiments. For example, in one embodiment, down-clocking factor N is equal to 10. In this embodiment, a long range data unit generated using the down-clocked clock rate is transmitted over a time that is ten times longer than the time it takes to transmit the corresponding short range data unit. In the frequency domain, according to this embodiment, a long range data unit generated using the down-clocked clock rate occupies a bandwidth that is ten times smaller then the bandwidth occupied by the corresponding short range data unit. In other embodiments, other suitable down-clocking factor (N) values are utilized, and transmission times and bandwidths of long range data units are scaled accordingly. In some embodiments, the down-clocking factor N is a power of two (e.g., N=8, 16, 32, etc.). In some embodiments, the long range communication protocol specifies more than one down-clocking factor N, with a different down-clocking factor N used in a different geographical region (e.g., N=16 in US, N=64 in Europe) to accommodate different bandwidth requirements of the different regions, for example.

In one embodiment, for example, data units that conform to the long range communication protocol are formatted at least substantially according to a data unit format defined by the IEEE 802.11a Standard. In another embodiment, data units that conform to the long range communication protocol are formatted at least substantially according to a data unit format defined, depending on a mode of operation, by the IEEE 802.11a Standard or the IEEE 802.11n Standard. In another embodiment, data units that conform to the long range communication protocol are formatted at least substantially according to a data unit format defined, depending on a mode of operation, IEEE 802.11a Standard or the IEEE 802.11n Standard Greenfield format. In another embodiment, data units that conform to the long range communication protocol are formatted at least substantially according to a data unit format defined, depending on a mode of operation, by the IEEE 802.11a Standard, the IEEE 802.11n Standard, or the IEEE 802.11ac Standard. In another embodiment, data units that conform to the long range communication protocol are formatted at least substantially according to a data unit format defined, depending on a mode of operation, by the IEEE 802.11a Standard, or the IEEE 802.11ac Standard. In another embodiment, data units that conform to the long range communication protocol are formatted at least substantially according to a data unit format defined, depending on a mode of operation, by the IEEE 802.11a Standard or the IEEE 802.11ac Standard. In another embodiment, data units that conform to the long range communication protocol are formatted at least substantially according to a data unit format defined, depending on a mode of operation, by the IEEE 802.11a Standard, IEEE 802.11n Standard Greenfield format, or the IEEE 802.11ac Standard. In another embodiment, data units that conform to the long range communication protocol are formatted at least substantially according to a data unit format defined by the IEEE 802.11n Standard. In another embodiment, data units that conform to the long range communication protocol are formatted at least substantially according to a data unit format defined by the IEEE 802.11n Standard Greenfield format. In another embodiment, data units that conform to the long range communication protocol are formatted at least substantially according to a data unit format defined by the IEEE 802.11ac Standard. In some embodiment described herein in which data units are formatted according to more than one short range communication protocol, preamble modulation formats as discussed above are used to permit a receiving device to determine (or auto-detect) the particular mode being utilized. Some example data units that conform to the long range communication protocol according to some embodiments are illustrated in FIGS. 9-13 and described in more detail below.

Figure 9:
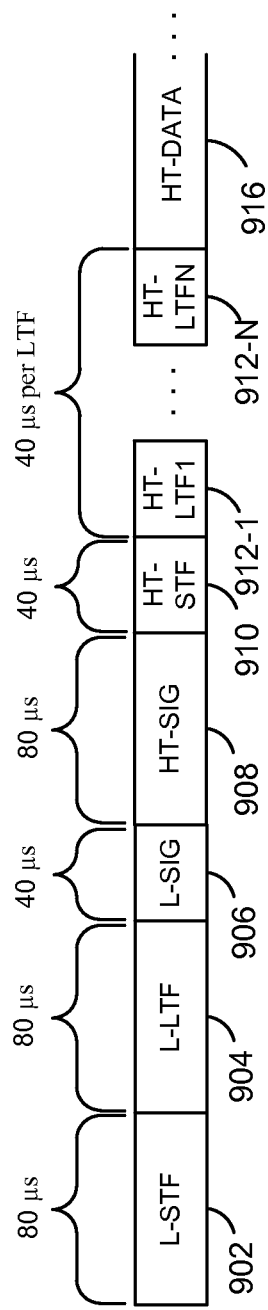
FIG. 9 is a diagram of a long range OFDM data unit, according to an embodiment.

FIG. 9 is a diagram of a long range OFDM data unit 900 that the AP 14 is configured to transmit to the client station 25-1 via orthogonal frequency domain multiplexing (OFDM) modulation, according to an embodiment. In an embodiment, the client station 25-1 is also configured to transmit the data unit 900 to the AP 14. The data unit 900 is similar to the data unit 500 of FIG. 5 except that the data unit 900 is transmitted using a clock rate that is down-clocked from the short range clock rate by a down-clocking factor N. As a result, a symbol duration of each OFDM symbol of the data unit 900 is N times longer compared to a symbol duration of an OFDM symbol included in the data unit 500. In the embodiment of FIG. 9, N is equal to 10. Accordingly, each OFDM symbol included in the data unit 900 is 10 times longer compared to an OFDM symbol included in the data unit 500. In other embodiments, other suitable down-clocking factors are utilized.

Figure 10:
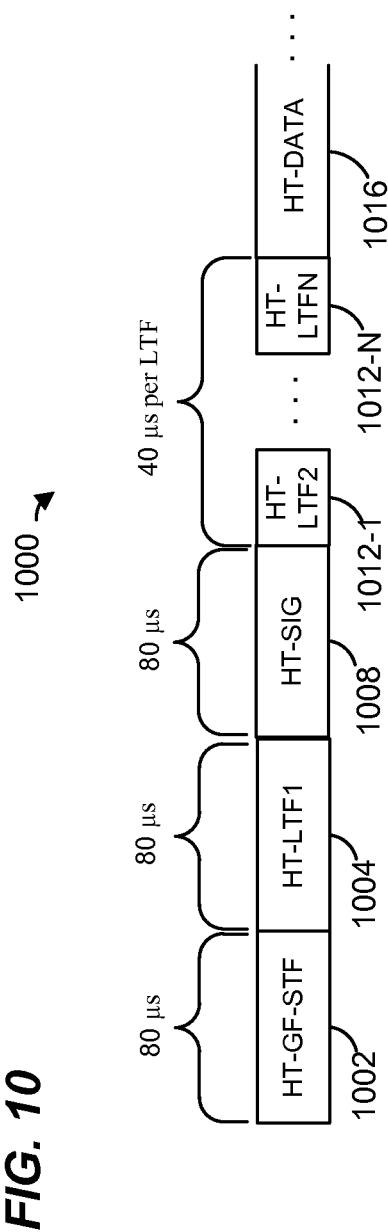
FIG. 10 is a diagram of a long range OFDM data unit, according to another embodiment.

FIG. 10 is a diagram of an example long range OFDM data unit 1000 that the AP 14 is configured to transmit to the client station 25-1 via orthogonal frequency domain multiplexing (OFDM) modulation, according to an embodiment. In an embodiment, the client station 25-1 is also configured to transmit the data unit 1000 to the AP 14. The data unit 1000 is similar to the "green-field" data unit 400 of FIG. 4, except that the data unit 1000 is transmitted using a clock rate that is down-clocked from the short range clock rate by a down-clocking factor N. As a result, symbol duration of each OFDM symbol of the data unit 1000 is N times longer compared to symbol duration of an OFDM symbol included in the data unit 400. In the embodiment of FIG. 10, N is equal to 10. Accordingly, each OFDM symbol included in the data unit 1000 is 10 times longer compared to an OFDM symbol included in the data unit 400. In other embodiments, other suitable down-clocking factors are utilized.

Figure 11:
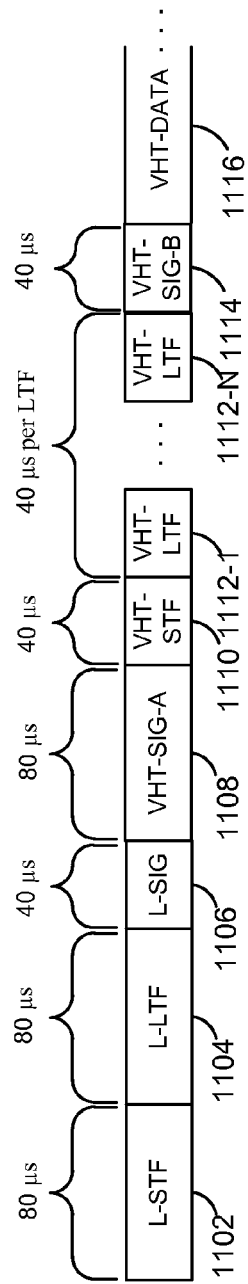
FIG. 11 is a diagram of a long range OFDM data unit, according to another embodiment.

FIG. 11 is a diagram of an OFDM data unit 1100 that the AP 14 is configured to transmit to the client station 25-1 via orthogonal frequency domain multiplexing (OFDM) modulation when operating in a long range mode, according to an embodiment. In an embodiment, the client station 25-1 is also configured to transmit the data unit 1100 to the AP 14. The data unit 1100 is similar to the data unit 500 of FIG. 5, except that the data unit 1100 is transmitted using a clock rate that is down-clocked from the short range clock rate by a down-clocking factor N. As a result, symbol duration of each OFDM symbol of the data unit 1100 is N times longer compared to symbol duration of an OFDM symbol included in the data unit 500. In the embodiment of FIG. 10, N is equal to 10. Accordingly, each OFDM symbol included in the data unit 1100 is 10 times longer compared to an OFDM symbol included in the data unit 500. In other embodiments, other suitable down-clocking factors are utilized.

Figure 12:
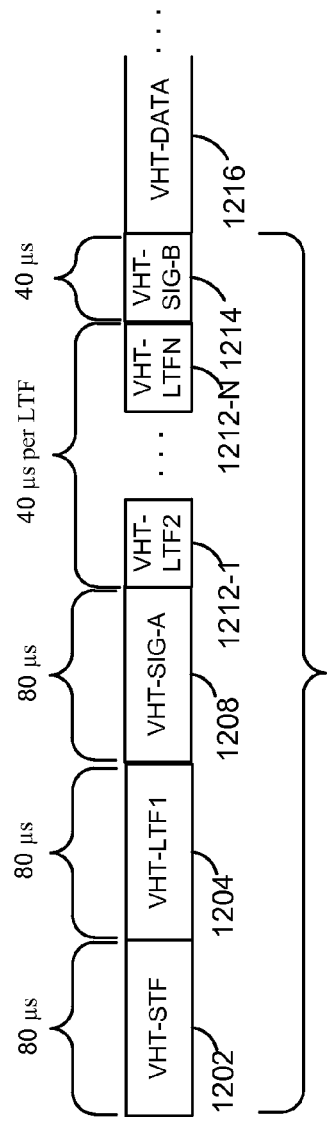
FIG. 12 is a diagram of a long range OFDM data unit, according to another embodiment.

FIG. 12 is a diagram of an OFDM data unit 1200 that the AP 14 is configured to transmit to the client station 25-1 via orthogonal frequency domain multiplexing (OFDM) modulation when operating in a long range mode, according to an embodiment. The data unit 1200 is similar to the data unit 1100 of FIG. 11 except that that the legacy portion of the preamble (i.e., L-STF 1102, L-LTF 1104, L-SIG 1106) is omitted from the data unit 1200. In one embodiment, the VHT-SIG-B field 1214 is omitted from the data unit 1200. Further, bit allocations for some or all fields of the data unit 1200 are different from the bit allocations defined by a short range communication protocol in some embodiments.

Figure 13:
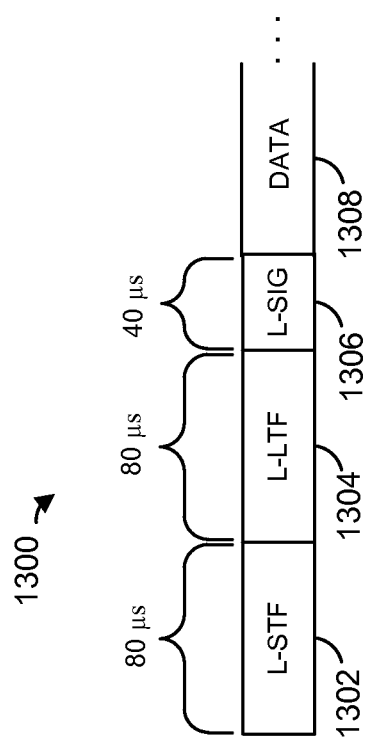
FIG. 13 is a diagram of a long range OFDM data unit, according to another embodiment.

FIG. 13 is a diagram of an OFDM data unit 1300 that the AP 14 is configured to transmit to the client station 25-1 via orthogonal frequency domain multiplexing (OFDM) modulation when operating in a long range mode, according to an embodiment. In an embodiment, the client station 25-1 is also configured to transmit the data unit 1300 to the AP 14. The data unit 1300 is similar to the data unit 200 of FIG. 2, except that the data unit 1300 is transmitted using a clock rate that is down-clocked from the short range clock rate by a down-clocking factor N. As a result, a symbol duration of each OFDM symbol of the data unit 1300 is N times longer compared to symbol duration of an OFDM symbol included in the data unit 200. In the embodiment of FIG. 10, N is equal to 10. Accordingly, each OFDM symbol included in the data unit 1300 is 10 times longer compared to an OFDM symbol included in the data unit 200. In other embodiments, other suitable down-clocking factors are utilized.

In some embodiments, the AP 14 and/or the client station 25-1 is able to operate in dual band configurations. In such embodiments, the AP 14 is able to switch between short range and long range modes of operation. Accordingly, in an embodiment, when operating in a short range mode, the AP 14 transmits and receives data units that conform to one or more of the short range communication protocols, and when operating in a long range mode, the AP 14 transmits and receives data units that conform to the long range communication protocol. In an embodiment, a dual band device utilizes a first clock suitable for short range operation and utilizes a second clock suitable for long range operation, where a frequency of the second clock is lower than a frequency of the first clock by a factor of N. In an embodiment, a dual band device generates the second clock signal for long range operation by down-clocking the first clock signal by a factor N. Accordingly, in such embodiments, the clock rate used in long range mode is a fraction of a clock rate used in short range mode. In such embodiment, data units for long range are generated according to a short range format using the lower clock rate, as discussed above. Further, in some embodiments, the AP 14 and/or the client station 25-1 is a dual band device that is able to switch between different low frequency bands defined for long range operation by the long range communication protocol (e.g., different sub-1 GHz frequency band defined by the long range communication protocol for different geographical areas). In yet another embodiment, the AP 14 and/or the client station 25-1 is a single band device configured to operate in only one long range frequency band. In some embodiments, when a data unit generated for long range mode but generally according to a short range PHY data unit format, as in the various modes discussed above, the preamble of the resulting data unit is altered such that the data unit is made more suitable for long range transmission. In other words, in such embodiments, a long range data unit is generated using a different (altered) preamble compared to the corresponding short range data unit. For example, transmission over a longer range requires a lower signal to noise ratio of transmitted signals. Accordingly, in some embodiments, a longer preamble is utilized for long range data units compared to short range data units to allow better channel training at the receiver and to thereby improve the receiver sensitivity. On the other hand, in some long range applications, a typical long range data unit carries less data than a typical short range data unit, and, consequently, the preamble occupies a bigger portion of a typical long range data unit than of a typical short range data unit. Therefore, it is beneficial to limit preamble length of long range data units in some embodiments. Another concern, in some situations, is that multipath delay experienced by long range data units in a communication channel is typically longer than the multipath delay experienced by a short range data unit. Further, longer transmission channels over which long range data units typically travel result in a larger frequency and phase offsets between a transmitter and a receiver in at least some situations.

In one embodiment, to combat the larger frequency offset, long range data units include single stream pilot tones in some or all of the long training fields of the preamble. For clarity, single stream pilot tone insertion techniques are explained below with reference to the long range data unit 1000 of FIG. 10. However, these or similar pilot insertion techniques are applied to other long range data units (e.g., data units of FIG. 9 or FIGS. 11-13), or other data unit formats, according to other embodiments.

With reference to FIG. 4, the short range data unit 400 does not include pilot tones in any of the HT-LTF fields 408. Referring to FIG. 10, the data unit 1000 is generated for long range transmission and, accordingly, includes OFDM symbols of longer duration and, consequently, LTF fields of the data unit 1000 are longer compared to the LTF fields of the data unit 400. The transmission carrier frequency used for long range transmission of the data unit 1000 is typically lower than the transmission carrier frequency used for short range transmission of the data unit 400. As an example, in one embodiment, the short range data unit 400 is transmitted in the 5 GHz frequency range, and the long range data unit 1000 is transmitted in the 900 MHz frequency range. Accordingly, in this embodiment, the carrier frequency used to transmit the data unit in short range mode is approximately five times greater than in long range mode. Thus, if the OFDM symbol duration, and, accordingly, the long training field length, is ten times greater in long range mode than in short range mode (e.g., if the down-clocking factor N is 10), then the lower frequency of transmission does not make up for the longer transmission time. Accordingly, a long training field is typically subject to a greater phase shift during transmission in long range mode than in short range mode. To mitigate the phase shift problem, in some embodiments, pilot tones are inserted into the training field of the long range data unit 1000 and are used for phase tracking between the transmitter and the receiver.

According to an embodiment, the data unit 1000 is a multi-stream data unit transmitted over a number of spatial streams in some scenarios. In this embodiment, if the inserted pilot tones are also multi-stream (e.g., mapped to the multiple spatial streams using the same mapping matrix as the mapping matrix used to map data tones), then at least a corresponding number of long training fields needs to be received before phase tracking can be performed. To enable a receiving device to perform phase tracking prior to having received all long training fields, in some embodiments, the pilot tones included in the long training fields 1012 of the data unit 1000 are single-stream pilot tones.

With continued reference to FIG. 10, in an embodiment, the OFDM data and pilot tones of the HT-LTF fields 1012 are mapped to multiple spatial streams according to Equation 1:

$$[HTLTF1_k, HTLTF2_k, \ldots, HTLTFN_k] = Q_k D_{CSD}^{(k)} A_{HTLTF}^k LTF_k$$

$$A_{HTLTF}^k = \begin{cases} R_{HTLTF}, & \text{if } k \in K_{Pilot} \\ P_{HTLTF}, & \text{otherwise} \end{cases}$$

Equation 1 where the subscript k denotes a tone index, Q is a spatial mapping matrix, $D_{CSD}$ is a diagonal matrix with diagonal elements representing cyclic shifts in the time domain, $A_{HTLTF}$ is a mapping matrix for the long training field, and $LTF_k$ is the long training field value for the $k^{th}$ tone. With continued reference to Equation 1, $K_{pilot}$ represents a set tone indices corresponding to pilot tones, and $P_{HTLHF}$ is a mapping matrix used for mapping long training field data tones to multiple spatial streams. As an example, according to an embodiment, $P_{HTLHF}$ for mapping LTF data tones to spatial streams is defined as:

$$P_{HTLTF} = \begin{bmatrix} 1 & -1 & 1 & 1 \\ 1 & 1 & -1 & 1 \\ 1 & 1 & 1 & -1 \\ -1 & 1 & 1 & 1 \end{bmatrix}$$

Equation 2

In an embodiment, a subset of the mapping matrix in Equation 2 is used for mapping LTF data tones if the data unit is to be transmitted using less than four spatial streams (e.g., a 2×2 subset matrix for two spatial streams with two LTFs, a 3×4 subset matrix for three spatial streams with four LTFs, etc.). Further, the $R_{HTLFT}$ matrix is a mapping matrix for LTF pilot tones, which is defined differently in different embodiments. In one embodiment, the $R_{HTLFT}$ matrix is as given in Equation 3:

$$[R_{HTLTF}]_{m,n} = [P_{HTLTF}]_{m,1}, 1 \leq m, n \leq N_{HTLTF}$$

Equation 3

Accordingly, in this embodiment, all pilot tones in the HT-LTF fields 1012 of the data unit 1000 are mapped to multiple spatial streams using the first column of the spatial stream mapping matrix P. Further, in this embodiment, the pilot tones in the data portion 1016 of the data unit 1000 are mapped as shown in Equation 4:

$$x_{k_{pilot}}(n) = Q_{k_{pilot}} D_{CSD}^{(k_{pilot})} [P_{HTLTF}]_{\cdot,1} p_{k_{pilot}}(n)$$

Equation 4 where n is a symbol index. That is, in this case, the pilot tones in the data portion are also mapped to multiple spatial streams using the first column of the tone mapping matrix P.

In another embodiment, the $R_{HTLFT}$ matrix is as defined in the IEEE 802.11ac Standard, given in Equation 5:

$$[R_{HTLTF}]_{m,n} = [P_{HTLTF}]_{1,n}, 1 \leq m, n \leq N_{HTLTF}$$

Equation 5

Accordingly, in this embodiment, all pilot tones in the HT-LTF fields 1012 of the data unit 1000 are mapped to multiple spatial streams using the first row of the spatial stream mapping matrix P. Further, in this embodiment, the pilot tones in the data portion 1016 of the data unit 1000 are mapped as shown in Equation 6:

$$x_{k_{pilot}}(n) = Q_{k_{pilot}} D_{CSD}^{(k_{pilot})} \begin{bmatrix} 1 \\ 1 \\ \vdots \\ 1 \end{bmatrix} p_{k_{pilot}}(n)$$

Equation 6 where n is a symbol index. That is, in this case, the pilot tones in the data portion are also mapped to multiple spatial streams using the first row of the tone mapping matrix P.

In some embodiments (with or without pilot tone insertion), a longer preamble is used for long range data units compared to the corresponding short range data units. According to an embodiment, the longer preamble is used to increase receiver sensitivity and improve SNR performance, for example.

Figure 14:
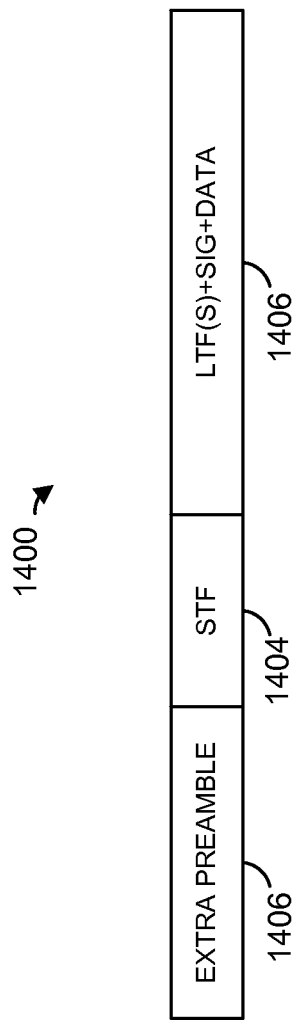
FIG. 14 is a diagram of a long range OFDM data unit, according to another embodiment.

FIG. 14 is a diagram of a long range OFDM data unit 1400 that the AP 14 is configured to transmit to the client station 25-1 via orthogonal frequency domain multiplexing (OFDM) modulation, according to an embodiment. In an embodiment, the client station 25-4 is also configured to transmit the data unit 1400 to the AP 14. The data unit 1400 is similar to various long range data units described above in reference to various down-clocked short range data units (such as, for example, the data unit 900 of FIG. 9, the data unit 1000 of FIG. 10, the data unit 1100 of FIG. 11, the data unit 1200 of FIG. 12, the data unit 1300 of FIG. 13), except that the data unit 1400 includes an extra preamble portion 1406. In an embodiment, the extra preamble portion 1406 includes a number of repetitions of short training sequences included in the STF field, for example. In some embodiment, the STF portion 1404 is omitted from the data unit 1400 when the data unit 1400 includes the extra preamble portion 1406. In some embodiments, long range data units such as the data unit 1400 include or omit the extra preamble portion depending on the mode of operation. In some such embodiments, the receiving client station is able to auto-detect whether a received data unit includes or omits the extra preamble based on the time of the boundary between the STF portion and the LTF portion of the preamble.

Figure 15:
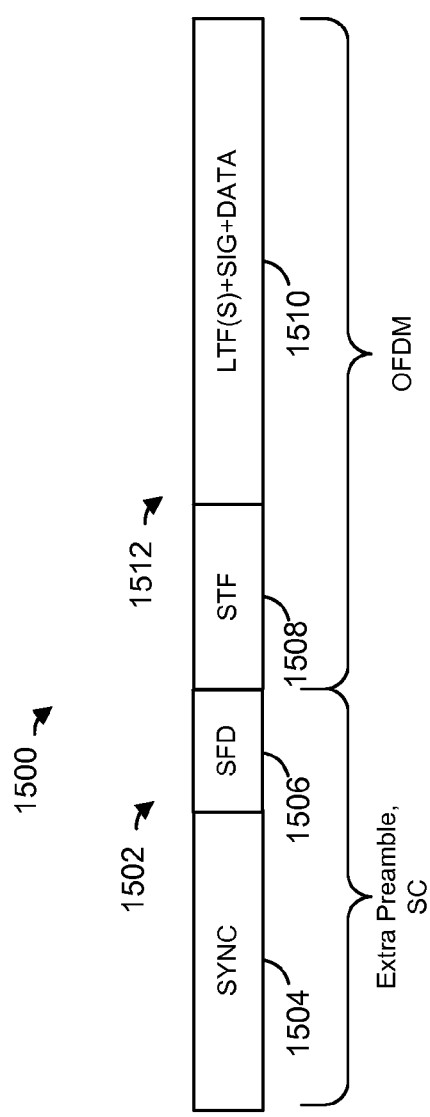
FIG. 15 is a diagram of a long range OFDM data unit, according to another embodiment.

FIG. 15 is a diagram of a long range OFDM data unit 1500 that the AP 14 is configured to transmit to the client station 25-1 via orthogonal frequency domain multiplexing (OFDM) modulation, according to an embodiment. In an embodiment, the client station 25-4 is also configured to transmit the data unit 1500 to the AP 14. The data unit 1500 is similar to the data unit 1400 of FIG. 4, except that the data unit 1500 includes a single carrier (SC) extra preamble portion 1502. The extra SC preamble 1602 includes the SYNC field 1406 and the SFD filed 1404. In an embodiment, the SC preamble is at least substantially the same as the SC preamble defined by the IEEE-802.11b Standard. In an embodiment, the SC preamble of the data unit 1500 is at least substantially the same as PLCP preamble 814 of the data unit 800 (FIG. 8), down-clocked by the same down-clocking factor N as the down-clocking factor used to generate the OFDM portion 1512. In another embodiment, a different down-clocking factor is used for the SC preamble portion 1502 compared to the down-clocking factor used for the OFDM portion 1512.

Figure 16:
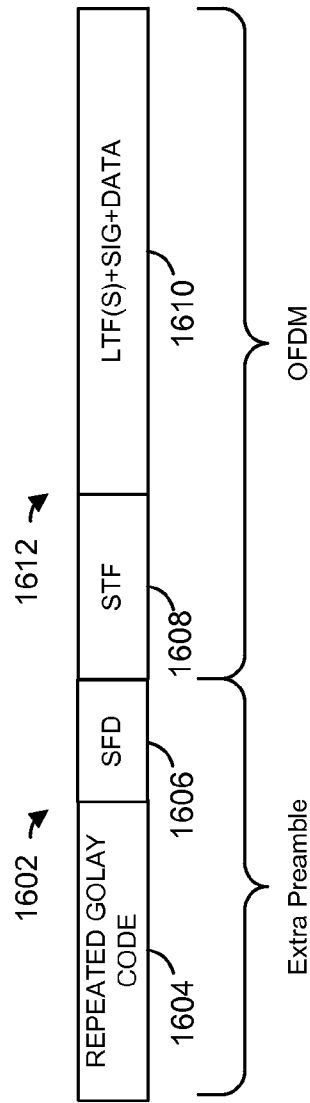
FIG. 16 is a diagram of a long range OFDM data unit, according to another embodiment.

FIG. 16 is a diagram of a long range OFDM data unit 1600 that the AP 14 is configured to transmit to the client station 25-1 via orthogonal frequency domain multiplexing (OFDM) modulation, according to an embodiment. In an embodiment, the client station 25-4 is also configured to transmit the data unit 1600 to the AP 14. The data unit 1600 is similar to the data unit 1500 of FIG. 5, except that in the data unit 1600 the SYNC field 1504 is replace by the Golay code field 1604. In some embodiments, the Golay code field includes a number of repetitions of a Golay complementary sequence (GCS), for example. The number of repetitions is determined based on the particular Golay sequence length utilized and the overall preamble length of the data unit 1600, in an embodiment. In some embodiments, Golay sequences of length 16, 32, 64, 128, or any other suitable length are utilized. In some embodiments, the long range communication protocol defines a long preamble and a short preamble, each consisting of a different number of Golay sequence repetitions. In one such embodiment, different complimentary sequences are utilized for the long and the short preamble cases (e.g., Ga sequence for the long preamble, and Gb sequence for the short preamble) to allow a receiver determine which type of preamble a received data unit includes. Generally, the two complementary sequences Ga and Gb have correlation properties suitable for detection at a receiving device. For example, the complementary spreading sequences Ga and Gb may be selected so that the sum of corresponding out-of-phase aperiodic autocorrelation coefficients of the sequences Ga and Gb is zero. In some embodiments, the complementary sequences Ga and Gb have a zero or almost-zero periodic cross-correlation. In another aspect, the sequences Ga and Gb may have aperiodic cross-correlation with a narrow main lobe and low-level side lobes, or aperiodic auto-correlation with a narrow main lobe and low-level side lobes.

In some embodiments which include an SC extra preamble portion, for wider bandwidth OFDM data units (e.g., 40 MHz, 80 MHz, 160 MHz, etc.), the SC preamble is repeated in each down-clocked 20 MHz sub-band. In some embodiments, the STF field (i.e., field 1508 in FIG. 15, filed 1608 in FIG. 16) is omitted.

In some embodiments, modes of operation according to the long range communication protocol include one or more lower data rate modes ("range extension mode"), in addition to down-clocked short range modes discussed above ("regular modes").

In one embodiment, for example, a range extension mode corresponds to a down-clocking factor that is higher compared to the down-clocking factor used for the regular modes. In other words, in this embodiment, the long range communication protocol defines two or more different down-clocking factors, a factor that is used for the regular mode, and one or more factors to be used in one or more range extension modes. In one embodiment, for example, a regular mode down-clocking factor is 10, and a second down-clocking factor used for the range extension mode is 20. In other embodiments, other suitable first and second down-clocking factors are utilized. In some embodiments in which multiple down-clocking factors are used, a long range data unit format includes an indication of which of the defined ratios is being utilized. For example, in an embodiment, a modulation technique similar to one of the techniques discussed above with respect to FIGS. 6 and 7 is used to signal the mode to a receiving device, wherein various preamble portions are modulated differently depending on which mode is being utilized. In this case, a receiver can determine which clock rate was used to transmit a data unit and set its own clock to properly decode the data, for example.

In another embodiment, a data unit generated for a range extension mode is generated using the same down-clocking factor as the factor used to generate a regular mode data unit, but using a Fast Fourier Transform (FFT) of a smaller size compared to the FFT size used to generate the data unit for a regular mode. In such embodiments, the smaller FFT size results in data units having less subcarriers in each OFDM symbol, thereby resulting in lower data rate and, accordingly, lower bandwidths occupied by a data unit generated in a range extension mode compared to the same data units generated using a larger size FFT for a regular mode. As an example, in one embodiment, a regular mode utilizes FFT of size 64 (or 128, 256, 512, or another suitable size greater than 64), and an extended range mode utilizes FFT size is 32, 16, or another suitable size less than 64. The particular mode being utilized, and thus the particular FFT size used to generate a data unit is signaled to a receiving device by preamble modulation techniques similar to those discussed above in regard to FIGS. 6-7, according to an embodiment.

Alternatively or additionally, in some embodiments, data units for transmission in range extension mode are single carrier data units generated according to a downclocked version of a single carrier short range data unit format (e.g., FIG. 8), while data units for transmission in regular mode are OFDM data units generated according to a downclocked version of an OFDM short range data unit format (e.g., FIGS. 9-13). In some such embodiment, the range extension mode (single carrier) data units and the regular mode (OFDM) data units are generated using the same down-clocking ratio N. In such embodiments, range extension data units typically occupy a smaller bandwidth compared to the lowest bandwidth occupied by regular mode data units. For example, if the down-clocking ratio N is equal to 10, then the regular mode lowest bandwidth is equal to 2 MHz (corresponding to the 20 MHz lowest bandwidth specified by the IEEE 802.11n and the IEEE 802.11ac Standards), according to an embodiment. In a range extension mode, on the other hand, a single carrier data unit generated according to the data unit format specified by the IEEE 802.11b Standard using the down-clocking ratio of 10 occupies a bandwidth that is equal to approximately 1.1 MHz (or $^{11}/_{20}$ of the bandwidth corresponding to the lowest bandwidth regular mode OFDM data unit). In other embodiments, a different down-clocking ratio is used to generate the range extension mode single carrier data units than the down-clocking factor used to generate the regular mode OFDM data units. For example, the down-clocking ratio for range extension mode is specified such that a single carrier range extension mode data unit occupies a bandwidth that is equal to a certain desired percentage of the lowest bandwidth occupied by a regular mode OFDM data unit (e.g., ½, ⅔, ¾, etc.). In one embodiment, the single carrier down-clocking factor is chosen such that a single carrier data unit in range extension mode occupies a bandwidth that is approximately the same as the bandwidth occupied by the data and pilot tones of a lowest band OFDM data unit transmitted in a regular mode.

According to the IEEE 802.11b Standard, data units are modulated using a direct sequence spread spectrum (DSSS) modulation technique or a complimentary code keying modulation (CCK) technique depending on the desired data rate, for example. Accordingly, in some embodiments in which data units in range extension mode are generated according to a down-clocked version of the PHY data unit format specified in the IEEE 802.11b Standard, such data units are modulated according to the corresponding modulation technique (i.e., DSSS or CCK). However, data rates associated with CCK modulation in the IEEE 802.11b Standard are higher than data rates associated with DSSS modulation and are similar to the lower data rate range associated with OFDM data units. Accordingly, in some embodiments, CCK modulation is not used, and range extension mode single carrier data units are modulated using the DSSS modulation technique to achieve the lower data rates generally desired in the range extension mode.

Further, in some embodiments utilizing DSSS modulation in range extension mode, a spreading code that is different from the 11-bit Barker spreading code specified in the IEEE 802.11b Standard is utilized. For example, in one embodiment, a 16-bit Golay complementary code is utilized. In another embodiment, a 32-bit Golay complementary code, or a different size Golay code, is utilized. Such codes generally provide better correlation performance compared to the Barker code, thereby providing a higher processing gain and lower signal to noise ratio (SNR) sensitivity of the signal. Further, such codes are useful in low power applications (such as sensors or smart meters, for example) because of a relatively simple correlator needed to decode the data at a receiving device However, the same 11-bit Barker code that is specified in the IEEE 802.11b Standard is utilized in some embodiments or situations.

In some embodiments, an AP (e.g., AP 14 of FIG. 1) and/or a client station (e.g. client station 25 of FIG. 1) uses a parallel carrier sensing technique to avoid packet collisions in a communication channel. In such embodiments, a device senses presence of SC and/or OFDM signals in a communication channel before transmitting an extension mode or a regular mode data unit, and delays transmissions if it is determined that the channel is being utilized by another device. In some embodiments, transmission in such situations is delayed by a randomized period after a device determines that the channel has become available, further reducing a chance of collision.

As indicated above, in some embodiment, the long range communication protocol defines more than one range extension mode. According to an embodiment, for example, the long range communication protocol specifies a single carrier data unit format, such as a down-clocked IEEE 802.11b PHY data unit format, to be used in a first range extension mode, and an OFDM data unit format down-clocked using a higher down-clocking factor, or generated using a smaller size FFT.

In various embodiments, an AP (e.g., AP 14) and/or a client station (e.g., the client station 25-1) includes a number of encoders (decoders) that are used in parallel to encode (decode) a data unit to accommodate various data rates of the transmitted (received) data units. According to an embodiment, because long range data units are typically transmitted at lower data rates compared to short range data units, the long range communication protocol specifies a different number of encoders (decoders) to be used for a particular data unit transmitted (received) at a down-clocked rate compared to the number of encoders specified for a corresponding data unit by a short range communication protocol. In another embodiment, the long range communication protocol specifies the same number of encoders (decoders) as specified for a corresponding data unit by short range communication protocol.

In some embodiments which utilized a down-clocking factor N to generate long range data units, various other parameters associated with the PHY format (such as the frequency domain and the time domain cyclic delay diversity (CDD), short interframe space (SIFS), reduced interframe spacing (RIFS), etc.) are also adjusted by the same factor N.

In some embodiments, two different long range communication protocols (e.g., IEEE 802.11ah and IEEE 802.11af) define generally the same PHY data unit formats, but utilize different down-clocking ratios, and accordingly different clock rates, to meet certain requirements associated with the respective specific frequency bands (such as available bandwidth), for example. Further, in some embodiments, a long range communication protocol specifies certain suitable channel sensing procedures to avoid or minimize signal collision (e.g., with TV channels or other wireless communication signals in the case of IEEE 802.af Standard which specifies operation in TV white space (TVWS).

Figure 17:
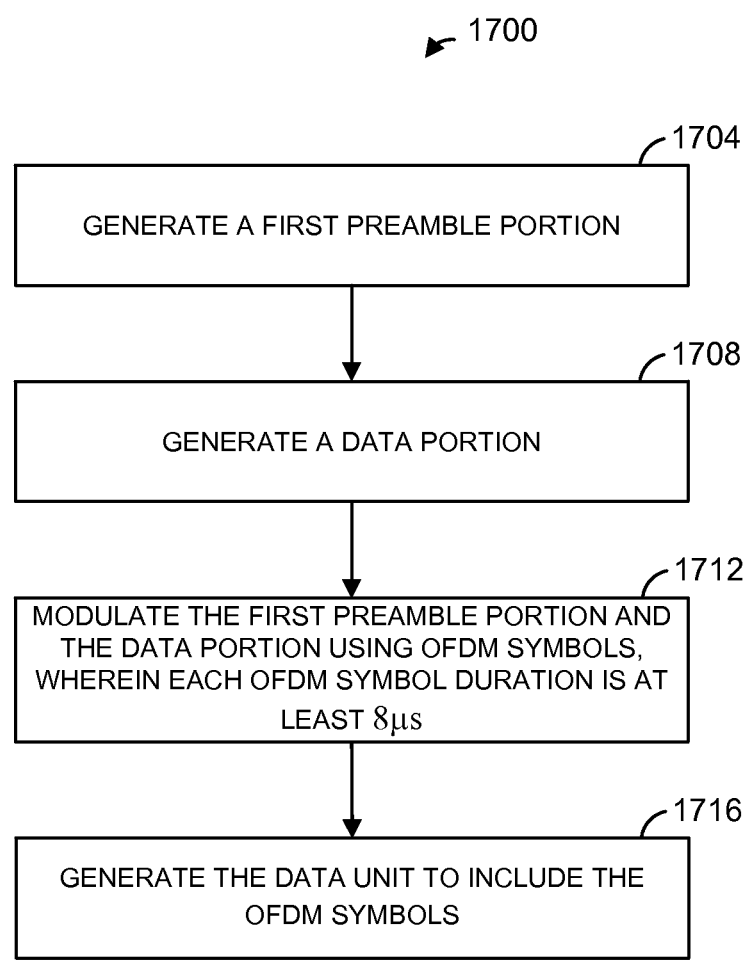
FIG. 17 is a flow diagram of an example method for generating a data unit, according to an embodiment.

FIG. 17 is a flow diagram of an example method 1700 for generating a data unit, according to an embodiment. With reference to FIG. 1, the method 1700 is implemented by the network interface 16, in an embodiment. For example, in one such embodiment, the PHY processing unit 20 is configured to implement the method 1700. According to another embodiment, the MAC processing 18 is also configured to implement at least a part of the method 1700. With continued reference to FIG. 1, in yet another embodiment, the method 1700 is implemented by the network interface 27 (e.g., the PHY processing unit 29 and/or the MAC processing unit 28). In other embodiments, the method 1700 is implemented by other suitable network interfaces.

At block 1704, a first preamble portion is generated. The first preamble portion has a format at least substantially similar to a preamble format specified by a short range communication protocol. In one embodiment, the preamble portion of the data unit 1200 of FIG. 12 is generated. In another embodiment, the first preamble portion is generated according to another suitable format and includes other suitable fields.

At block 1708, a data portion is generated. At block 1712, the first preamble portion generated at block 1704 and the data portion generated at block 1708 are modulated using OFDM modulation. The symbol duration of each OFDM symbol generated at block 1712 is at least 8 μs. In one embodiment, the OFDM symbol duration is 40 μs. In another embodiment, the OFDM symbol duration is another suitable value of at least 8 μs. At block 1716, the data unit is generated to include the OFDM symbols generated at block 1708.

Figure 18:
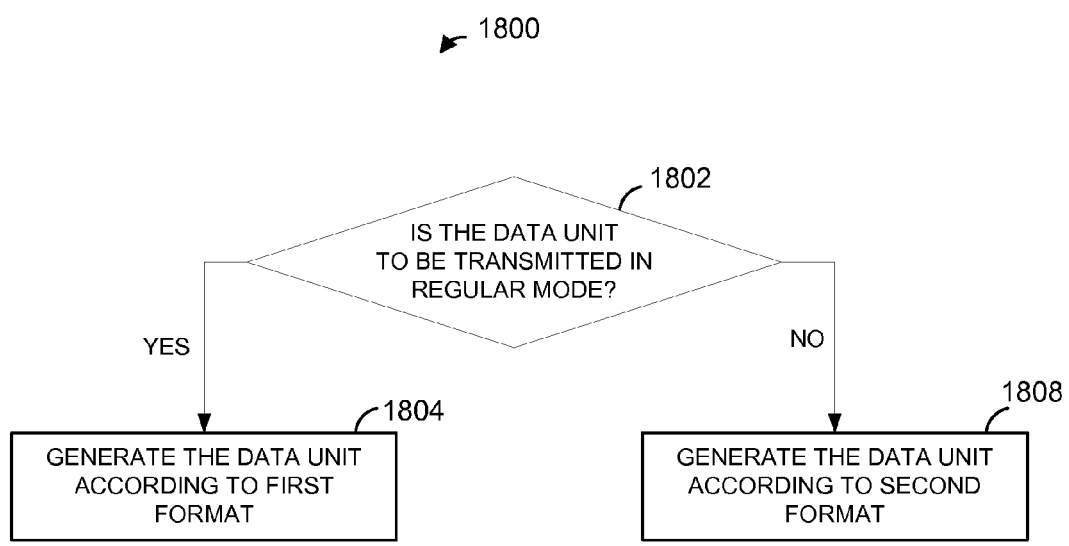
FIG. 18 is a flow diagram of another example method for generating a data unit, according to another embodiment.

FIG. 18 is a flow diagram of an example method 1800 for generating a data unit, according to an embodiment. With reference to FIG. 1, the method 1800 is implemented by the network interface 16, in an embodiment. For example, in one such embodiment, the PHY processing unit 20 is configured to implement the method 1800. According to another embodiment, the MAC processing 18 is also configured to implement at least a part of the method 1800. With continued reference to FIG. 1, in yet another embodiment, the method 1800 is implemented by the network interface 27 (e.g., the PHY processing unit 29 and/or the MAC processing unit 28). In other embodiments, the method 1800 is implemented by other suitable network interfaces.

At block 1802, it is determined in which mode the data unit should be transmitted. If it is determined at block 1802 that the data unit is to be transmitted in a regular mode, then the data unit is generated according to a first format. In an embodiment, the data unit 1200 of FIG. 12 is generated. In another embodiment, another suitable data unit is generated. On the other hand, if it is determined at block 1802 that the data unit is not to be transmitted in a regular mode (i.e., the data unit is to be transmitted in an extended range mode), then the data unit is generated according to a second format at block 1808. In an embodiment, the data unit at block 1804 is generated using a FFT of size 64. In another embodiment, another suitable size FFT that is larger than 64 is utilized. The data unit at block 1804 is generated using a smaller size FFT, such as an FFT of size 32 or an FFT of size 16 or another suitable FFT size that is smaller than 64, and accordingly, the data unit generated at block 1808 has a bandwidth that is smaller compared to when the data unit is generated at block 1804. A preamble of the data unit is modulated such that a receiving device can determine the bandwidth of the data unit.

At least some of the various blocks, operations, and techniques described above may be implemented utilizing hardware, a processor executing firmware instructions, a processor executing software instructions, or any combination thereof. Also, some of the various blocks, operations, and techniques may be performed in a different order (and/or concurrently) and still achieve desirable results. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. Likewise, the software or firmware instructions may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software or firmware instructions may be delivered to a user or a system via a communication channel such as a telephone line, a DSL line, a cable television line, a fiber optics line, a wireless communication channel, the Internet, etc. (which are viewed as being the same as or interchangeable with providing such software via a transportable storage medium). The software or firmware instructions may include machine readable instructions that, when executed by the processor, cause the processor to perform various acts.

When implemented in hardware, the hardware may comprise one or more of discrete components, an integrated circuit, an application-specific integrated circuit (ASIC), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method for generating a physical layer (PHY) data unit for transmission to a receiving device via a communication channel, the method comprising:

generating the PHY data unit according to a first PHY format when the PHY data unit is to be transmitted in a regular mode, wherein generating the PHY data unit according to the first PHY format comprises generating the preamble to have a first length, and wherein the first PHY format corresponds to the PHY data unit spanning a first frequency bandwidth;

generating the PHY data unit according to a second PHY format when the PHY data unit is to be transmitted in an extended range mode, wherein generating the PHY data unit according to the second PHY format comprises generating the preamble to have a second length greater than the first length, and wherein the second PHY format corresponds to the PHY data unit spanning a second frequency bandwidth;

wherein a portion of a preamble of the PHY data unit is i) modulated according to a first modulation scheme when the PHY data unit is generated according to the first PHY format, and ii) modulated according to a second modulation scheme when the PHY data unit is generated according to the second PHY format; and transmitting the PHY data unit via the communication channel with the portion of the preamble modulated, to signal to the receiving device whether the PHY data unit spans the first frequency bandwidth or the second frequency bandwidth, wherein the receiving device is configured to auto-detect whether the PHY data unit spans the first frequency bandwidth or the second frequency bandwidth by detecting whether the portion of the preamble is modulated according to the first modulation scheme or the second modulation scheme.

2. The method of claim 1, wherein:

generating the PHY data unit according to the first PHY format comprises generating orthogonal frequency division (OFDM) symbols using a Fast Fourier Transform of a first size; and generating the PHY data unit according to the second PHY format comprises generating OFDM symbols using a Fast Fourier Transform of a second size.

3. The method of claim 2, wherein the second size is less than or equal to 32.

4. The method of claim 3, wherein the first size is greater than or equal to 64.

5. The method of claim 1, wherein:
generating the PHY data unit according to the first PHY format comprises generating the preamble to have long training fields that do not include pilot tones; and
generating the PHY data unit according to the second PHY format comprises generating the preamble to have long training fields that include pilot tones.

6. An apparatus comprising:
a network interface having one or more integrated circuits, the network interface including:
a media access control (MAC) unit implemented on the one or more integrated circuits, and
a physical layer (PHY) unit coupled to the MAC unit and implemented on the one or more integrated circuits;
wherein the PHY unit is configured to:
when a PHY data unit is to be transmitted to a receiving device via a communication channel in a regular mode, generate the PHY data unit according to a first PHY format, wherein generating the PHY data unit according to the first PHY format comprises generating the preamble to have a first length, and wherein the first PHY format corresponds to the PHY data unit spanning a first frequency bandwidth;
when the PHY data unit is to be transmitted to the receiving device via the communication channel in an extended range mode, generate the PHY data unit according to a second PHY format, wherein generating the PHY data unit according to the second PHY format comprises generating the preamble to have a second length greater than the first length, and wherein the second PHY format corresponds to the PHY data unit spanning a second frequency bandwidth;
wherein a portion of a preamble of the PHY data unit is i) modulated according to a first modulation scheme when the PHY data unit is generated according to the first PHY format, and ii) modulated according to a second modulation scheme when the PHY data unit is generated according to the second PHY format; and
transmit the PHY data unit via the communication channel with the portion of the preamble modulated, to signal to the receiving device whether the PHY data unit spans the first frequency bandwidth or the second frequency bandwidth, wherein the receiving device is configured to auto-detect whether the PHY data unit spans the first frequency bandwidth or the second frequency bandwidth by detecting whether the portion of the preamble is modulated according to the first modulation scheme or the second modulation scheme.

7. The apparatus of claim 6, wherein the PHY unit is configured to:
use a Fast Fourier Transform of a first size to generate the PHY data unit according to the first format; and
use a Fast Fourier Transform of a second size to generate the PHY data unit according to the second PHY format.

8. The apparatus of claim 7, wherein the second size is less than or equal to 32.

9. The apparatus of claim 8, wherein the first size is greater than or equal to 64.

10. The apparatus of claim 6, wherein the one or more integrated circuits are configured to:
when generating the PHY data unit according to the first PHY format, generate the preamble to have long training fields that do not include pilot tones; and
when generating the PHY data unit according to the second PHY format, generate the preamble to have long training fields that include pilot tones.

11. A tangible, non-transitory computer readable medium or media storing machine readable instructions that, when executed by one or more processors, cause the one or more processors to:
control a network interface device to generate a physical layer (PHY) data unit according to a first PHY format when the PHY data unit is to be transmitted to a receiving device via a communication channel in a regular mode, wherein generating the PHY data unit according to the first PHY format comprises generating the preamble to have a first length, and wherein the first PHY format corresponds to the PHY data unit spanning a first frequency bandwidth;
control the network interface device to generate the PHY data unit according to a second PHY format when the PHY data unit is to be transmitted to the receiving device via the communication channel in an extended range mode, wherein generating the PHY data unit according to the second PHY format comprises generating the preamble to have a second length greater than the first length, and wherein the second PHY format corresponds to the PHY data unit spanning a second frequency bandwidth;
control the network interface device to modulate a portion of a preamble of the PHY data unit i) according to a first modulation scheme when the PHY data unit is generated according to the first PHY format, and ii) according to a second modulation scheme when the PHY data unit is generated according to the second PHY format; and
control the network interface device to transmit the PHY data unit via the communication channel with the portion of the preamble modulated, to signal to the receiving device whether the PHY data unit spans the first frequency bandwidth or the second frequency bandwidth, wherein the receiving device is configured to auto-detect whether the PHY data unit spans the first frequency bandwidth or the second frequency bandwidth by detecting whether the portion of the preamble is modulated according to the first modulation scheme or the second modulation scheme.

12. The computer readable medium or media of claim 11, further storing machine readable instructions that, when executed by one or more processors, cause the one or more processors to:
control the network interface device to generate orthogonal frequency division (OFDM) symbols using a Fast Fourier Transform of a first size when generating the PHY data unit according to the first PHY format; and
control the network interface device to generate OFDM symbols using a Fast Fourier Transform of a second size when generating the PHY data unit according to the second PHY format.

13. The computer readable medium or media of claim 12, wherein the second size is less than or equal to 32.

14. The computer readable medium or media of claim 13, wherein the first size is greater than or equal to 64.

15. The computer readable medium or media of claim 11, wherein:
   generate the preamble to have long training fields that do not include pilot tones when generating the PHY data unit according to the first PHY format; and
   generating the preamble to have long training fields that include pilot tones when generating the PHY data unit according to the second PHY format.

\* \* \* \* \*